United States Patent
Park et al.

(10) Patent No.: US 10,701,636 B2
(45) Date of Patent: Jun. 30, 2020

(54) ELECTRONIC DEVICE AND COMMUNICATION CONNECTION METHOD OF ELECTRONIC DEVICE

(71) Applicants: Samsung Electronics Co., Ltd., Suwon-si, Gyeonggi-do (KR); INDUSTRY-ACADEMIC COOPERATION FOUNDATION, YONSEI UNIVERSITY, Seoul (KR)

(72) Inventors: Gil-Joo Park, Yongin-si (KR); Seung-Jae Han, Seoul (KR); Sun-Hyun Kim, Seocho-gu (KR); Soo-Hoon Moon, Guri-si (KR); Jung-Han Han, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 15/778,518

(22) PCT Filed: Oct. 10, 2016

(86) PCT No.: PCT/KR2016/011312
§ 371 (c)(1),
(2) Date: May 23, 2018

(87) PCT Pub. No.: WO2017/095012
PCT Pub. Date: Jun. 8, 2017

(65) Prior Publication Data
US 2018/0343618 A1 Nov. 29, 2018

(30) Foreign Application Priority Data

Dec. 3, 2015 (KR) .................. 10-2015-0171729

(51) Int. Cl.
*H04W 52/02* (2009.01)
*H04W 8/18* (2009.01)
(Continued)

(52) U.S. Cl.
CPC ....... *H04W 52/0245* (2013.01); *H04W 8/183* (2013.01); *H04W 52/028* (2013.01);
(Continued)

(58) Field of Classification Search
None
See application file for complete search history.

(56) References Cited

U.S. PATENT DOCUMENTS

2008/0125163 A1* 5/2008 Chi .................. H04L 41/12
455/550.1
2009/0234863 A1* 9/2009 Evans ............... G06Q 10/107
(Continued)

FOREIGN PATENT DOCUMENTS

JP 2009-049875 A 3/2009
KR 10-2011-0071823 A 6/2011
(Continued)

*Primary Examiner* — Kodzovi Acolatse
*Assistant Examiner* — Jay L Vogel
(74) *Attorney, Agent, or Firm* — Jefferson IP Law, LLP

(57) ABSTRACT

According to various embodiments, an electronic device comprises: a plurality of communication interfaces; and a control unit which is configured to determine an application program related to a currently-executed communication and select a communication interface to be used from among the plurality of communication interfaces on the basis of at least a part of information related to the application program related to the currently-executed communication, user profile information related to the communication, and information on consumption energy in each communication state of each of the plurality of communication interfaces. Other various embodiments are possible.

16 Claims, 11 Drawing Sheets

(51) Int. Cl.
*H04W 48/18* (2009.01)
*H04W 88/06* (2009.01)

(52) U.S. Cl.
CPC ........ *H04W 52/0258* (2013.01); *H04W 48/18* (2013.01); *H04W 88/06* (2013.01); *Y02D 70/10* (2018.01); *Y02D 70/14* (2018.01); *Y02D 70/20* (2018.01)

(56) References Cited

U.S. PATENT DOCUMENTS

| | | | |
|---|---|---|---|
| 2014/0219194 A1 | 8/2014 | Varoglu et al. | |
| 2014/0258397 A1* | 9/2014 | Heerboth | H04L 12/12 709/204 |
| 2014/0313954 A1* | 10/2014 | Choi | H04W 52/0258 370/311 |
| 2015/0029945 A1 | 1/2015 | Do et al. | |
| 2015/0350068 A1* | 12/2015 | Tung | H04W 80/06 370/392 |

FOREIGN PATENT DOCUMENTS

| | | |
|---|---|---|
| KR | 10-2012-0012580 A | 2/2012 |
| KR | 10-2012-0095576 A | 8/2012 |
| KR | 10-2012-0124119 A | 11/2012 |

\* cited by examiner

ELECTRONIC DEVICE AND COMMUNICATION CONNECTION METHOD OF ELECTRONIC DEVICE

CROSS-REFERENCE TO RELATED APPLICATION(S)

This application is a National Phase Entry of PCT International Application No. PCT/KR2016/011312, which was filed on Oct. 10, 2016, and claims priority to Korean Patent Application No. 10-2015-0171729, which was filed on Dec. 3, 2015, the contents of which are incorporated herein by reference.

BACKGROUND

1. Field

The present disclosure generally relates to wireless communication, and more particularly, to an electronic device capable of selecting an optimal communication interface among a plurality of communication interfaces to connect communication according to a current network condition and a communication connection method of the electronic device.

2. Description of the Related Art

Generally, an Internet of things (IoT) wireless network includes a plurality of IoT devices, and each IoT device transmits and receives data using at least one communication interface. As the size of the IoT network increases and the number of IoT devices included in the network increases, charging of a battery may become difficult or impossible. Because of this, saving energy in the IoT devices is a very important issue.

Conventionally, when communication is performed using a single communication interface, it is possible to have better energy efficiency than other communication interfaces in terms of a certain range of total data transmission size and transmission speed. For example, in the case of Bluetooth, when the size of data transmitted per unit time is small and the total size of transmitted data is small, it is possible to have higher energy efficiency than wireless fidelity (Wi-Fi). Conversely, in the case of Wi-Fi, when the size of data transmitted per unit time is large and the total data transmission amount is large, it is possible to have higher energy efficiency than Bluetooth.

In addition, conventionally, when communication is performed using multiple communication interfaces, a direct connection between the IoT devices or between the IoT device and an IoT gateway may be stopped, or a communication connection may be disconnected due to factors such as environmental changes in a moving situation. In this case, an indirect connection via the Internet or another IoT device is reestablished using another built-in communication interface (e.g., cellular or Wi-Fi communication interface).

SUMMARY

In the case in which communication is performed using a single communication interface as in the prior art, when data in a specific range preset in the communication interface is transmitted, it is possible to have good energy efficiency. However, when data in a range other than the specific range is transmitted, the energy efficiency may be lowered in comparison with other communication interfaces. Accordingly, in the case in which communication is performed using a single communication interface as in the prior art, it is difficult to adapt in data transmission in various network environments and channel conditions so that the energy efficiency may be lowered.

In the case in which communication is performed using multiple communication interfaces, when a direct connection between electronic devices or between an electronic device and a gateway is suspended or disconnected, an indirect connection may be reestablished via the Internet or other electronic devices (e.g., external electronic devices). However, in the indirect connection, a relatively large amount of energy may be consumed in comparison with the direct connection, and a reconnection process may be performed after an application program confirms a connection failure so that communication of the executed application program may be disconnected or user convenience may be degraded.

Accordingly, there is a need for an electronic device capable of reducing energy consumption and preventing communication disconnection when a communication connection is established using multiple communication interfaces and a communication connection method of the electronic device.

According to various embodiments, it is possible to provide an electronic device which may maximize energy efficiency when data is exchanged between electronic devices by configuring a plurality of communication interfaces and switching them to optimal communication interfaces according to various network conditions to connect communication and a communication connection method of the electronic device are provided.

According to various embodiments, an electronic device includes a plurality of communication interfaces, and a controller configured to determine a currently being application program related to communication and to select a communication interface to be used among the plurality of communication interfaces on the basis of at least a part of information related to the currently being application program related to the communication, user profile information related to the communication, or information on consumption energy for each communication state of each of the plurality of communication interfaces.

According to various embodiments, a communication connection method of an electronic device includes determining a currently being application program related to a communication, and selecting a communication interface to be used among the plurality of communication interfaces on the basis of at least a part of information related to the currently being application program related to communication, user profile information related to the communication, or information on consumption energy for each communication state of each of the plurality of communication interfaces.

An electronic device according to various embodiments may select a communication interface having minimum consumption energy on the basis of consumption energy at the time of communication which is calculated for each of a plurality of communication interfaces according to a communication history pattern of the electronic device generated by the use of communication of a user, and may perform a communication connection, thereby reducing energy consumed in transmitting/receiving data between electronic devices.

In addition, an electronic device according to various embodiments may convert one Internet protocol (IP) and port allocated to an upper layer (e.g., application layer)

between a plurality of communication interfaces of the upper layer and an MAC layer so as to correspond to the plurality of communication interfaces, so that the communication disconnection may be eliminated in switching between the plurality of communication interfaces and the communication efficiency may be maximized due to a reduction in the consumption energy, thereby improving the user convenience.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
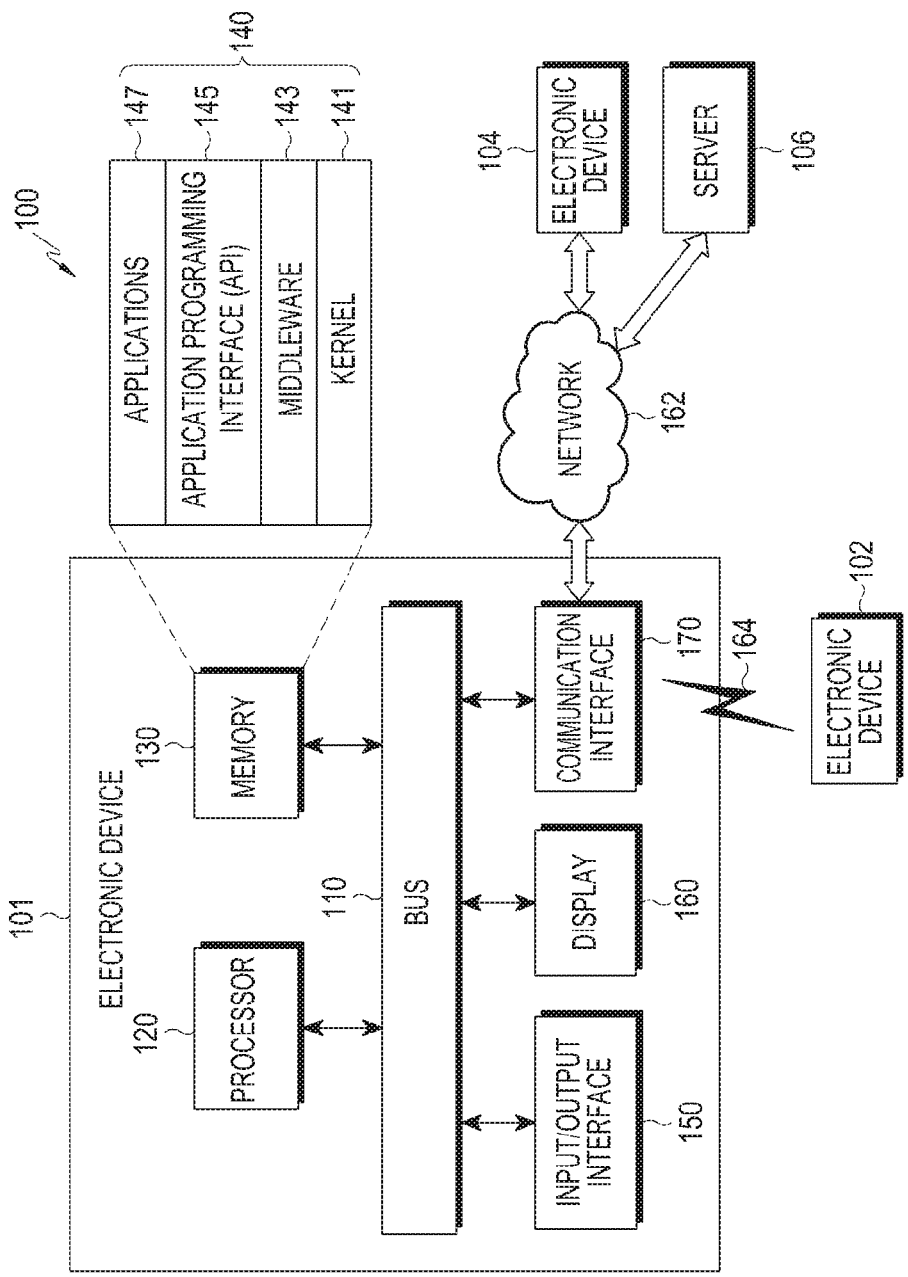
FIG. 1 is a diagram illustrating an electronic device in a network environment according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

Referring to FIG. 1, in various embodiments, an electronic device 101 in a network environment 100 is described. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 120, 130, and 150 to 170 with one another and transferring communications (e.g., control messages and/or data) between the components.

The processor 120 includes one or more of a central processing unit (CPU), an application processor (AP), and a communication processor (CP). The processor 120 may perform control of at least one of the other components of the electronic device 101, and/or perform an operation or data processing relating to communication. The processor 120 may be referred to as a controller, or may include the controller as a part thereof or configure the controller.

The memory 130 includes a volatile and/or non-volatile memory. For example, the memory 130 may store commands or data related to at least one other component of the electronic device 101. According to one embodiment, the memory 130 may store software and/or a program 140. The program 140 may include a kernel 141, a middleware 143, an application programming interface (API) 145, and/or an application program (or "application") 147, and the like. At least a portion of the kernel 141, the middleware 143, and the API 145 may be referred to as an operating system (OS).

The kernel 141 may control or manage system resources (e.g., the bus 110, the processor 120, or the memory 130) used to perform operations or functions implemented in other programs (e.g., the middleware 143, the API 145, or the application program 147). The kernel 141 may provide an interface that allows the middleware 143, the API 145, or the application program 147 to access the individual components of the electronic device 101 to control or manage the system resources.

The middleware 143 may function as a relay to allow the API 145 or the application program 147 to communicate with the kernel 141 to exchange data.

Further, the middleware 143 may process one or more task requests received from the application program 147 in order of priority. For example, the middleware 143 may assign at least one of the application programs 147 with a priority for using system resources (e.g., the bus 110, processor 120, or memory 130) of the electronic device 101. For example, the middleware 143 may perform scheduling or load balancing on the one or more task requests by processing the one or more task requests according to the priority assigned to at least one of the application programs 147.

The API 145 is an interface allowing the application 147 to control functions provided from the kernel 141 or the middleware 143. For example, the API 145 may include at least one interface or function (e.g., a command) for filing control, window control, image processing, or text control.

The input/output interface 150 may serve as an interface that may transfer commands or data input from a user or other external devices to another component(s) of the electronic device 101. Further, the input/output interface 150 may output commands or data received from another component(s) of the electronic device 101 to the user or the other external device.

The display 160 includes a liquid crystal display (LCD), a light-emitting diode (LED) display, an organic light-emitting diode (OLED) display, a microelectromechanical systems (MEMS) display, or an electronic paper display. The display 160 may display various contents (e.g., text, images, videos, icons, or symbols) to the user. The display 160 includes a touchscreen and may receive a touch, gesture, proximity or hovering input using an electronic pen or a body portion of the user.

The communication interface 170 may set up communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106). For example, the communication interface 170 may include a communication processor (CP), and the CP may configure one of a plurality of modules constituting the communication interface 170. In one embodiment, the CP may be included in the processor 120.

The wireless communication may use at least one of, e.g., long term evolution (LTE), LTE-advanced (LTE-A), code division multiple access (CDMA), wideband CDMA (WCDMA), universal mobile telecommunication system (UMTS), wireless broadband (WiBro), and global system for mobile communication (GSM), as a cellular communication protocol. Further, the wireless communication includes a short-range communication 164. The short-range communication 164 includes at least one of, e.g., wireless fidelity (Wi-Fi), Bluetooth, near-field communication (NFC), and global navigation satellite system (GNSS). The GNSS includes at least one of, e.g., global positioning system (GPS), global navigation satellite system (Glonass), Beidou navigation satellite system (hereinafter, referred to as "Beidou"), Galileo, and the European global satellite-based navigation system. Hereinafter, the terms "GPS" and the "GNSS" may be interchangeably used. The wired communication includes at least one of universal serial bus (USB), high definition multimedia interface (HDMI), recommended standard (RS)-232, and plain old telephone service (POTS). The network 162 includes at least one of communication networks, e.g., a computer network (e.g., LAN or WAN), Internet, and a telephone network.

Each of the first and second external electronic devices 102 and 104 may be a device of the same or a different type from the electronic device 101. According to one embodiment, the server 106 may include a group of one or more servers. According to various embodiments, all or some of operations executed on the electronic device 101 may be executed on another or multiple other electronic devices (e.g., the electronic devices 102 and 104 or server 106). According to one embodiment, when the electronic device 101 should perform any function or service automatically or at a request, the electronic device 101, instead of or in addition to executing the function or service on its own, may request another device (e.g., the electronic devices 102 and 104 or server 106) to perform at least some of the functions or services. In this case, the other electronic device (e.g., the electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used.

Figure 2:
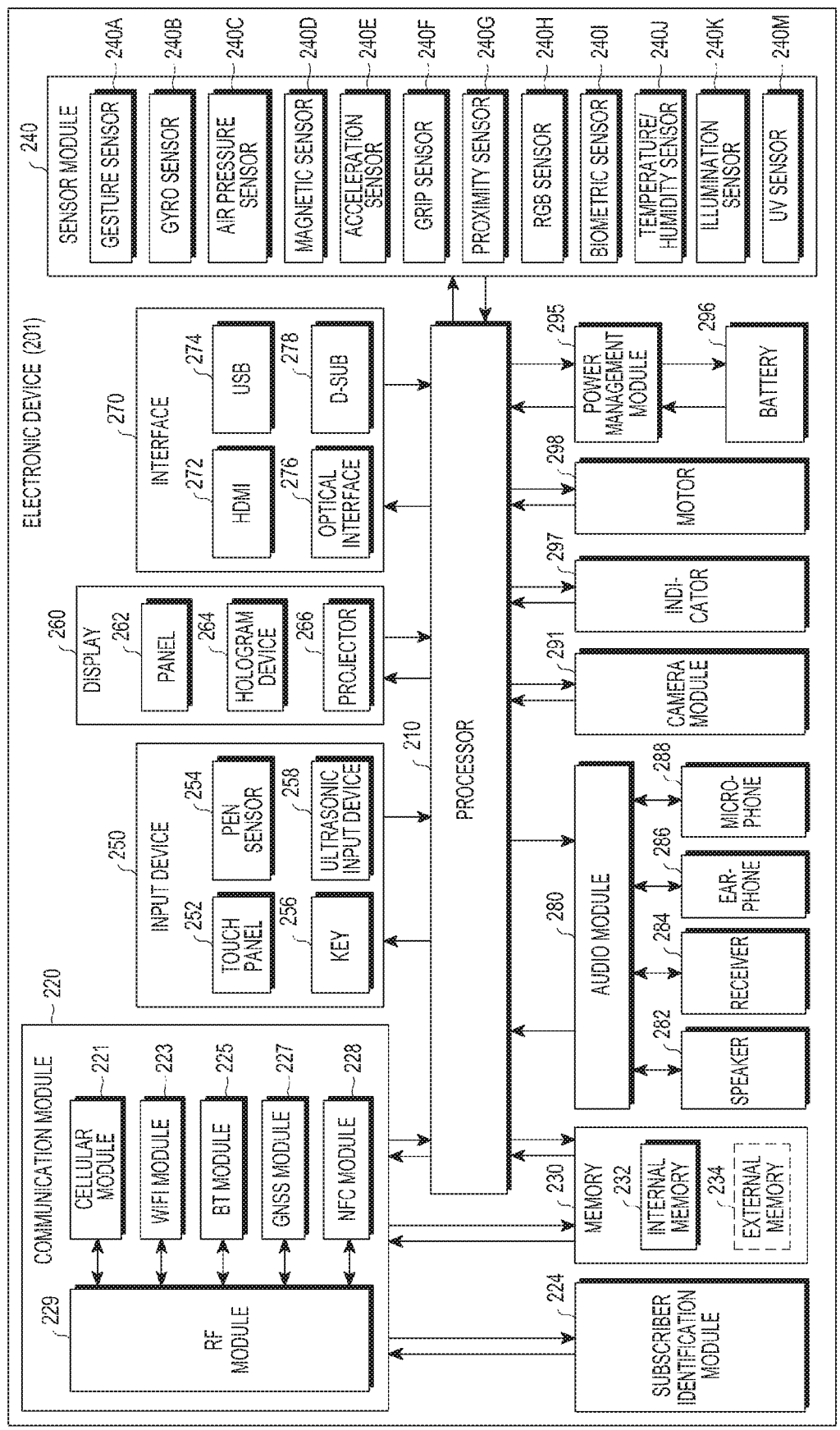
FIG. 2 is a block diagram illustrating an electronic device according to various embodiments.

FIG. 2 is a block diagram illustrating an electronic device 201 according to various embodiments. The electronic device 201 may include all or part of the electronic device 101 illustrated in FIG. 1. The electronic device 201 may include one or more processors (e.g., an application processor (AP)) 210, a communication module 220, a memory 230, a sensor module 240, an input device 250, and a display 260, and may further include at least one of a subscriber identification module 224, an interface 270, an audio module 280, a camera module 291, a power management module 295, a battery 296, an indicator 297, and a motor 298.

The processor 210 may control multiple hardware and software components connected to the processor 210 by running, for example, an operating system or an application program, and the processor 210 may process and compute various data. The processor 210 may have the same or similar configuration as or to the processor 120 of FIG. 1. The processor 210 may be implemented in a system on chip (SoC). According to one embodiment, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) into a volatile memory, process the command or data, and store various data in the non-volatile memory.

The communication module 220 may have the same or similar configuration as or to the communication interface 170 of FIG. 1. The communication module 220 includes at least one of a cellular module 221, a Wi-Fi module 223, a Bluetooth module 225, a GNSS module 227 (e.g., GPS module, Glonass module, Beidou module or Galileo module), an NFC module 228, and a radio frequency (RF) module 229.

The cellular module 221 may provide voice call, video call, text, or Internet services through a communication network. According to one embodiment, the cellular module 221 may perform identification or authentication on the electronic device 201 in the communication network using a subscriber identification module (e.g., SIM card) 224. According to one embodiment, the cellular module 221 may perform at least some of the functions providable by the processor 210. According to one embodiment, the cellular module 221 may include a communication processor (CP).

Each of the Wi-Fi module 223, the Bluetooth module 225, the GNSS module 227, or the NFC module 228 may include a process for processing data transmitted and received through the corresponding module. According to one embodiment, at least some of the cellular module 221, the Wi-Fi module 223, the Bluetooth module 225, the GNSS module 227, and the NFC module 228 may be included in a single integrated circuit (IC) or an IC package.

The RF module 229 may transmit and receive communication signals (e.g., RF signals). The RF module 229 may include a transceiver, a power amp module (PAM), a frequency filter, a low noise amplifier (LNA), or an antenna. According to another embodiment, at least one of the cellular module 221, the Wi-Fi module 223, the Bluetooth module 225, the GNSS module 227, and the NFC module 228 may transmit and receive RF signals through a separate RF module.

The subscriber identification module 224 may include a card including a subscriber identification module and/or an embedded SIM and may contain unique identification information (e.g., an integrated circuit card identifier (ICCID) or subscriber information (e.g., an international mobile subscriber identity (IMSI)).

The memory 230 (e.g., the memory 130) includes an internal memory 232 and/or an external memory 234. The internal memory 232 may include at least one of a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, and solid state drive (SSD).

The external memory 234 may include a flash drive, e.g., a compact flash (CF) memory, a secure digital (SD) memory, a micro secure digital (micro-SD) memory, a mini secure digital (mini-SD) memory, an extreme digital (xD) memory, or a memory stick. The external memory 234 may be functionally and/or physically connected with the electronic device 201 via various interfaces.

The sensor module 240 may measure a physical quantity or detect an operation state of the electronic device 201, and may convert the measured or detected information into an electrical signal. The sensor module 240 includes at least one of a gesture sensor 240A, a gyro sensor 240B, an air pressure sensor 240C, a magnetic sensor 240D, an acceleration sensor 240E, a grip sensor 240F, a proximity sensor 240G, a color sensor (e.g., red-green-blue (RGB) sensor) 240H, a biometric sensor 240I, a temperature/humidity sensor 240J, an illumination sensor 240K, and an Ultra Violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a finger print sensor. The sensor module 240 may further include a control circuit for controlling at least one or more of the sensors included in the sensor module 240. In some embodiments, the electronic device 201 may further include a processor configured to control the sensor module 240 as a part of the processor 210 or separately from the processor 210, and the electronic device 201 may control the sensor module 240 while the processor 210 is in a sleep mode.

The input device 250 may include a touch panel 252, and may further include at least one of a (digital) pen sensor 254, a key 256, and an ultrasonic input device 258. The touch panel 252 may use at least one of capacitive, resistive, infrared, and ultrasonic methods. The touch panel 252 may further include a control circuit. The touch panel 252 may further include a tactile layer and may provide a user with a tactile reaction.

The (digital) pen sensor 254 may include a part of a touch panel or a separate sheet for recognition. The key 256 may include a physical button, optical key or key pad. The ultrasonic input device 258 may detect ultrasonic waves generated from an input tool through a microphone (e.g., the microphone 288) and confirm data corresponding to the detected ultrasonic waves.

The display 260 (e.g., the display 160) may include a panel 262, and may further include a hologram device 264, and/or a projector 266. The display 260 may include the same or similar configuration as or to the display 160 of FIG. 1. The panel 262 may be implemented to be flexible, transparent, or wearable. The panel 262 may also be incorporated with the touch panel 252 in a module. The hologram device 264 may display three-dimensional (3D) images in the air by using light interference. The projector 266 may display an image by projecting light onto a screen. The screen may be, for example, located inside or outside of the electronic device 201. According to one embodiment, the display 260 may further include a control circuit for controlling the panel 262, the hologram device 264, or the projector 266.

The interface 270 includes at least one of a high-definition multimedia interface (HDMI) 272, a USB 274, an optical interface 276, and a D-subminiature (D-sub) 278. The interface 270 may be included in the communication interface 170 shown in FIG. 1. Additionally and alternatively, the interface 270 may include a mobile high-definition link (MHL) interface, a secure digital (SD) card/multimedia card (MMC) interface, or infrared data association (IrDA) standard interface.

The audio module 280 may convert a sound signal into an electrical signal and vice versa. At least some components of the audio module 280 may be included, for example, in the input/output interface 150 shown in FIG. 1. The audio module 280 may process sound information input or output through, for example, a speaker 282, a receiver 284, an earphone 286, or the microphone 288.

The camera module 291 may be a device for capturing still images and videos, and according to one embodiment, may include one or more image sensors (e.g., front and back sensors), a lens, an image signal processor (ISP), or a flash (e.g., an LED or xenon lamp).

The power manager module 295 may manage power of the electronic device 201. According to one embodiment, the power manager module 295 may include a power management integrated circuit (PMIC), a charger integrated circuit (IC), a battery, or a fuel gauge. The PMIC may have a wired and/or wireless recharging scheme. The wireless charging scheme may include a magnetic resonance scheme, a magnetic induction scheme, or an electromagnetic wave-based scheme, and may further include an additional circuit for wireless charging such as a coil loop, a resonance circuit, a rectifier, or the like. The battery gauge may measure an amount of remaining power, a voltage, a current, or a temperature of the battery 296. The battery 296 may include a rechargeable battery or a solar battery.

The indicator 297 may indicate a particular state of the electronic device 201 or a part (e.g., the processor 210) of the electronic device 201, such as a booting state, a message state, or recharging state. The motor 298 may convert an electric signal to a mechanical vibration and may generate a vibrational or haptic effect. Although not shown, the electronic device 201 may include a processing unit (e.g., GPU) for supporting a mobile TV. The processing unit for supporting the mobile TV may process media data conforming to a standard for digital multimedia broadcasting (DMB), digital video broadcasting (DVB), or mediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
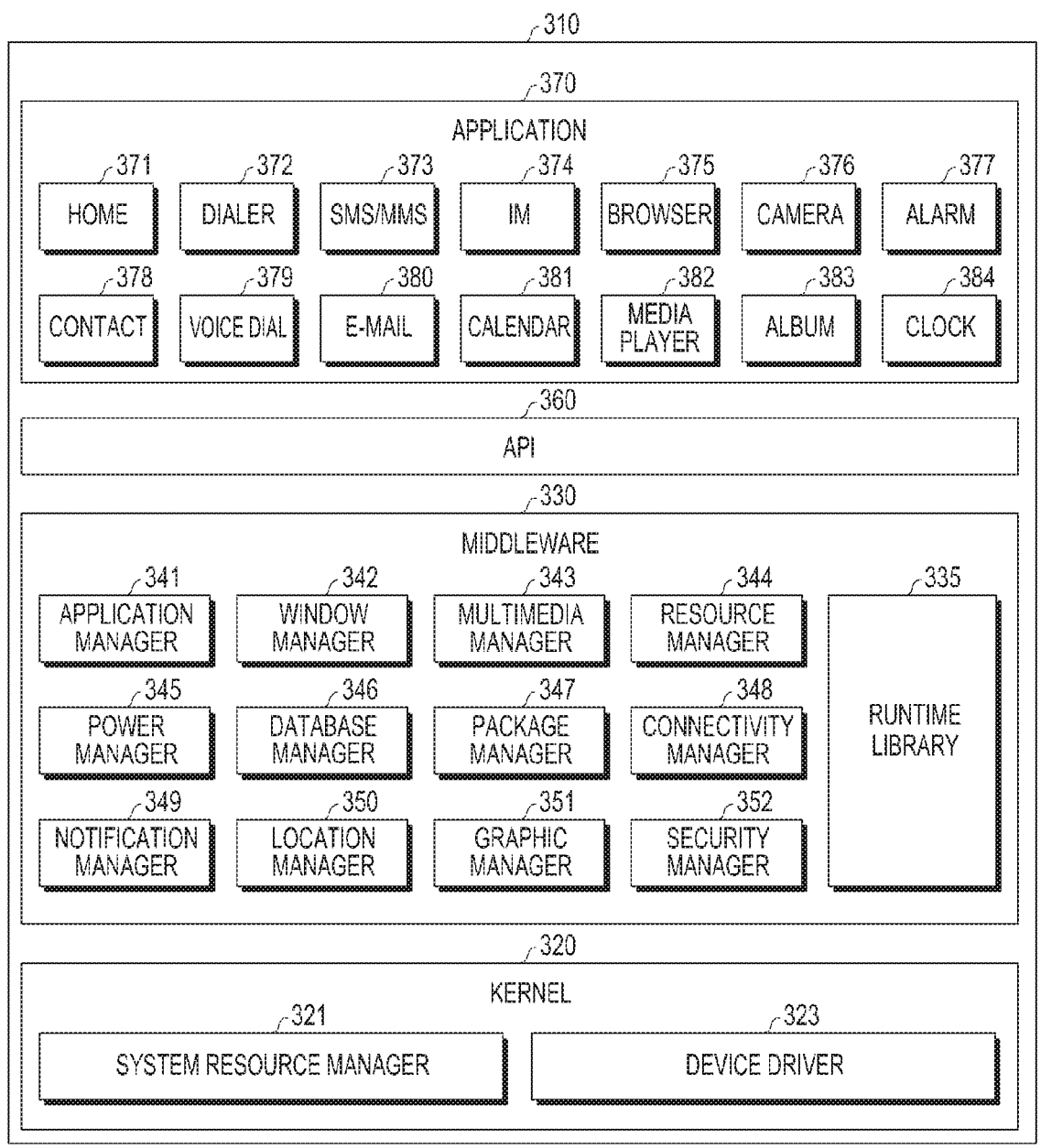
FIG. 3 is a block diagram illustrating a program circuit according to various embodiments.

FIG. 3 is a block diagram illustrating a program circuit according to various embodiments. According to one embodiment, a program circuit 310 (e.g., the program 140) may include an operating system (OS) controlling resources related to the electronic device 101 and/or various applications (e.g., application program 147) driven on the operating system. The operating system may include, e.g., Android™, iOS™, Windows™, Symbian™, Tizen™, or Samsung Bada OS™.

The program circuit 310 includes a kernel 320, middleware 330, an application programming interface (API) 360, and/or an application 370. At least a part of the program circuit 310 may be preloaded on the electronic device 101 or may be downloaded from an external electronic device (e.g., the electronic devices 102 and 104 or a server 106).

The kernel 320 (e.g., the kernel 141) may include a system resource manager 321 and/or a device driver 323. The system resource manager 321 may perform control, allocation, or recovery of system resources. According to one embodiment, the system resource manager 321 may include a process managing unit, a memory managing unit, or a file system managing unit. The device driver 323 may include a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device 101 or provide functions jointly required by the application 370. According to one embodiment, the middleware 330 (e.g., the middleware 143) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module used by a compiler in order to add a new function through a programming language while the application 370 is being executed. The runtime library 335 may perform input/output management, memory management, or operation on arithmetic functions.

The application manager 341 may manage the life cycle of at least one application 370. The window manager 342 may manage GUI resources used on a screen of the electronic device 101. The multimedia manager 343 may recognize formats necessary for playing various media files and use a codec appropriate for the corresponding format to perform encoding or decoding on media files. The resource manager 344 may manage resources, such as source code of at least one application 370, or a memory or storage space.

The power manager 345 may operate together with a basic input/output system (BIOS) to manage a battery or power and provide power information necessary for operating the electronic device. The database manager 346 may generate, search, or vary a database to be used in at least one application 370. The package manager 347 may manage installation or update of an application that is distributed in the form of a package file.

The connectivity manager 348 may manage wireless connectivity, such as Wi-Fi or Bluetooth. The notification manager 349 may display or notify an event, such as an incoming message, appointment, or proximity notification without interfering with a user. The location manager 350 may manage locational information on the electronic device. The graphic manager 351 may manage graphic effects to be offered to a user and a related user interface. The security manager 352 may provide various security functions necessary for system security or user authentication. According to one embodiment, when an electronic device (the electronic device 101) has telephony capability, the middleware 330 may further include a telephony manager for managing voice call or video call functions of the electronic device 101.

The middleware 330 may include a middleware module forming a combination of various functions of the above-described components. The middleware 330 may provide a specified module for each type of operating system in order to provide a differentiated function. Further, the middleware 330 may dynamically omit some existing components or add new components.

The API 360 (e.g., the API 145) may be a set of API programming functions and may have different configurations depending on operating systems. For example, in the case of Android™ or iOS™, one API set may be provided per platform, and in the case of Tizen™, two or more API sets may be provided per platform.

The application 370 (e.g., the application 147) includes one or more applications that may perform functions of a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, a clock 384, a health-care function (e.g., measuring the degree of workout or blood sugar), or environmental information (e.g., air pressure, moisture, or temperature information).

According to one embodiment, the application 370 may include an application (hereinafter, for convenience of description, referred to as "information exchange application") for supporting information exchange between an electronic device (the electronic device 101) and an external electronic device (e.g., the electronic device 102 or 104). The information exchange application may include, for example, a notification relay application for transferring specific information to an external electronic device, or a device management application for managing an external electronic device.

For example, the notification relay application may include a function for relaying notification information generated from another application (e.g., SMS/MMS application, email application, health-care application, or environmental information application) of the electronic device to an external electronic device (e.g., the electronic device 102 or 104). Further, the notification relay application may receive notification information from the external electronic device and may provide the received notification information to a user.

The device management application may manage (e.g., install, delete, or update) at least one function (e.g., adjusting turning-on/turning-off of an external electronic device itself (or some components thereof) or adjusting brightness (or adjusting resolution) of a display) of an external electronic device (e.g., the electronic device 102 or 104) communicating with the electronic device, and services (e.g., call service or message service) provided from an application operated in the external electronic device or an external electronic device.

According to one embodiment, the application 370 may include an application (e.g., a health-care application of a mobile medical device) designated according to an attribute of the external electronic device (e.g., the electronic devices 102 and 104). According to one embodiment, the application 370 may include an application received from the external electronic device (e.g., the server 106 or electronic devices 102 and 104). According to one embodiment, the application 370 may include a preloaded application or a third-party application downloadable from the server. The names of the components of the program circuit 310 according to the illustrated embodiment may be varied depending on the type of operating system.

According to various embodiments, at least a part of the program circuit 310 may be implemented in software, firmware, hardware, or in a combination of two or more thereof.

At least a part of the program circuit 310 may be implemented (e.g., executed) by, for example, a processor (e.g., the processor 210). At least a part of the program circuit 310 may include a module, program, routine, sets of instructions, process, or the like for performing one or more functions.

Figure 4:
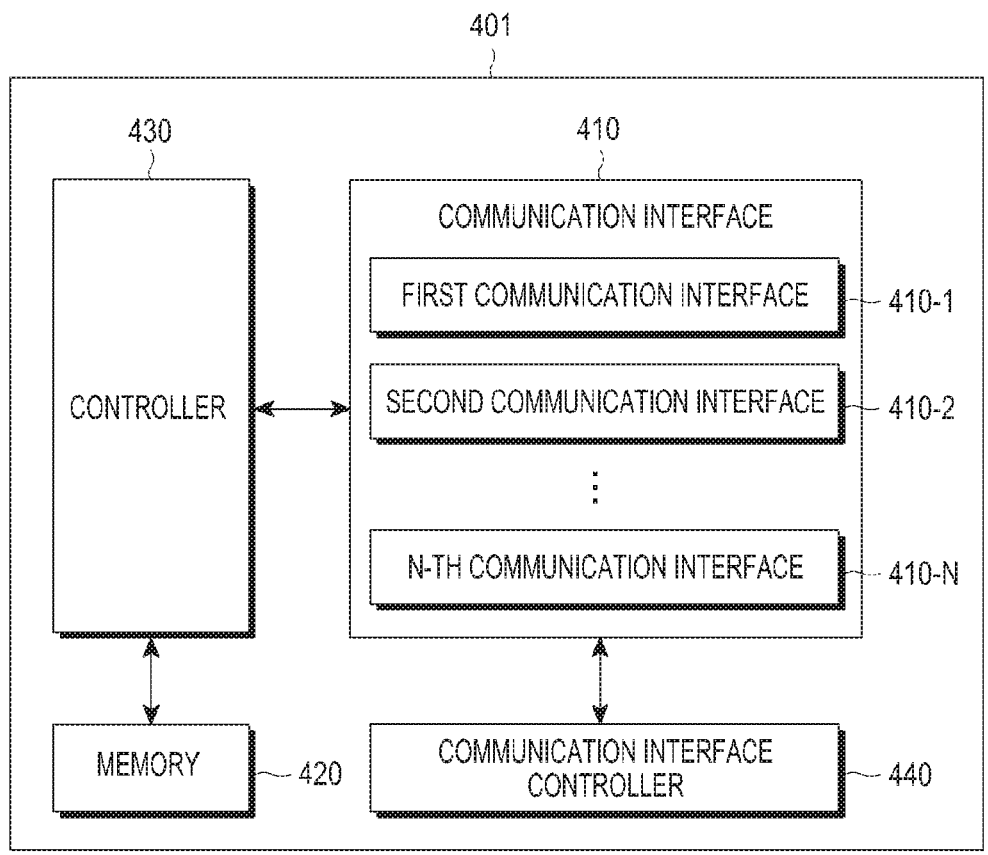
FIG. 4 is a block diagram illustrating an electronic device according to various embodiments.

FIG. 4 is a block diagram illustrating an electronic device according to various embodiments.

Referring to FIG. 4, the electronic device 401 according to various embodiments may include a communication interface 410, a memory 420, and a controller 430. The electronic device 401 may include some or all of the electronic devices 101 shown in FIG. 1 and the electronic devices 201 shown in FIG. 2.

The communication interface 410 may include a plurality of communication interfaces 410-1 to 410-N. According to one embodiment, the communication interface 410 may include at least one of a communication interface capable of providing near-field communication-based data and a communication interface capable of providing packet data (or Internet protocol)-based services. For example, the communication interface capable of providing near-field communication-based data may include at least one of Wi-Fi, Bluetooth, NFC, ZigBee, Z-wave, and a GNSS. In addition, the communication interface capable of providing packet data (or Internet protocol)-based services may include at least one of a computer network (e.g., a LAN or WAN), the Internet, and a telephone network. Hereinafter, for ease of explanation, the communication interface 410 includes first and second communication interfaces 410-1 and 410-2. Assuming that the first communication interface 410-1 is Bluetooth, and the second communication interface 410-2 is Wi-Fi, description will be made. However, it should be understood by those skilled in the art that the communication interface 410 may further include various other communication interfaces.

The memory 420 stores information related to an application program related to communication that can be supported or installed in the electronic device 401, user profile information related to the communication, or information on consumption energy for each communication state of each of a plurality of communication interfaces 410-1 to 410-N. According to one embodiment, the information related to the application program includes at least one of an application program name (application name), whether the application program is currently being used (application suspend), a minimum bandwidth requested by the application program (minimum required bandwidth), and an application program usage (sustained) time. The application program usage (sustained) time may include a total usage time of the application program (total continuance time), a network usage cycle (classified by block) of the application program, and the like. The electronic device 401 may select an optimal communication interface among the plurality of communication interfaces 410-1 to 410-N on the basis of the information related to the application program. For example, when the minimum bandwidth required by the application program is preset, the electronic device 401 may select the communication interface to be used as a communication interface corresponding to the preset bandwidth among the plurality of communication interfaces 410-1 to 410-N.

According to one embodiment, the user profile information may include a communication history pattern (hereinafter, referred to as "user pattern") of the electronic device 401 by the use of communication of a user. The user pattern may be analyzed and generated in association with information required when the application program related to the communication is used. For example, the electronic device 401 may preset a unit time, i.e., a window size, for analyzing the user pattern. The electronic device 401 may analyze the user pattern using the usage time, the continuance time, the usage cycle, and data transmission and reception amount (size) of each application program of the user for the unit time of the preset window size.

According to one embodiment, the unit time of the window size may be one of, for example, seconds, minutes, hours, days, and years. The electronic device 401 may set the window size variously, and may generate a user pattern including at least one of the application program usage pattern of the user analyzed over time for each set window size and data usage amount pattern according to the application program usage pattern. The generated user pattern may be stored in the memory 420 as the user profile information. The electronic device 401 may select the optimal communication interface among the plurality of communication interfaces 410-1 to 410-N on the basis of the user profile information. A method of selecting the communication interface will be described later with reference to FIGS. 5A to 11.

According to one embodiment, the information on consumption energy for each communication state of each of the plurality of communication interfaces may be information on consumption energy for each communication state which is preset with respect to each communication interface included in the communication interface 410, and may include at least one of minimum/maximum/average consumption energy at the time of turn on of each communication interface, minimum/maximum/average consumption energy at the time of turn off thereof, minimum/maximum/average consumption energy at the time of idle, minimum/maximum/average consumption energy at the time of connect, average consumption energy per unit data (e.g., about 1 KB/s) at the time of data transmission, and average consumption energy per unit data (e.g., about 1 KB/s) at the time of data reception. Table 2 below shows an example of consumption energy for each communication state of the first communication interface 410-1 (e.g., Bluetooth), and Table 2 shows an example of consumption energy for each communication state of the second communication interface 410-2 (e.g., Wi-Fi).

TABLE 1

| Bluetooth State | Avg. Energy(mJ) | Min.(mJ) | Max. (mJ) |
|---|---|---|---|
| Turn On | 47.69 | 39.03 | 58.72 |
| Turn Off | 14.79 | 12.6 | 16.16 |
| Idle | 25.88 | 25.86 | 2591 |
| Connect | 1569.18 | 1484.75 | 1627.35 |
| Data(Tx) | 860.89 + 2.447*(data size) | | |
| Data(Rx) | 595.08 + 1.974*(data size) | | |

TABLE 2

| Wi-Fi State | Avg. Energy(mJ) | Min.(mJ) | Max. (mJ) |
|---|---|---|---|
| Turn On | 1044.42 | 1019.91 | 1089.42 |
| Turn Off | 44.85 | 53.96 | 66.59 |
| Idle | 56.37 | 55.8 | 56.92 |
| Connect | 2512.96 | 2123.71 | 2784.74 |
| Data(Tx) | 165.42 + 0.336*(data size) | | |
| Data(Rx) | 151.56 + 0.242*(data size) | | |

Referring to Tables 1 and 2, it can be seen that the first communication interface 410-1 has relatively small average consumption energy at the time of turn on, turn off, idle, and connect in comparison with the second communication interface 410-2. On the other hand, it can be seen that the first communication interface 410-1 has relatively larger average consumption energy per unit data at the time of data transmission and reception in comparison with the second communication interface 410-2. For example, the first communication interface 410-1 may further reduce the consumed energy in comparison with the second communication interface 410-2 at the time of idle or when a small amount of data is transmitted and received. The second communication interface 410-2 may further reduce the consumed energy in comparison with the first communication interface 410-1 when a large amount of data is transmitted and received. In this manner, the electronic device 401 may select the optimal communication interface from the plurality of communication interfaces 410-1 to 410-N on the basis of the consumption energy for each communication state of each of the plurality of communication interfaces 410-1 to 410-N. The method of selecting the communication interface will be described later in detail with reference to FIGS. 5A to 11.

The controller 430 may generally control the electronic device 401. The controller 430 may include, for example, some or all of the processor 120 shown in FIG. 1 or the processor 210 shown in FIG. 2. The controller 430 may select a communication interface to be used among a plurality of communication interfaces 410-1 to 410-N on the basis of at least a part of information related to an application program which is currently being executed in the electronic device 401, user profile information related to the communication, or information on consumption energy for each communication state of each of the plurality of communication interfaces 410-1 to 410-N.

The controller 430 may set a time unit of a user pattern to obtain the user profile information. For example, the controller 430 may generate a user pattern analyzed using the type of an application program (e.g., voice call, file transport protocol (FTP), instant message, broadcasting, or navigation) used for a unit time (e.g., 1 minute) in the electronic device 401, a usage time of each application program, a continuance time, a usage cycle, and data transmission and reception amount (size). The generated user pattern may be stored in the memory 420. The controller 430 may select the communication interface to be used among the plurality of communication interfaces 410-1 to 410-N on the basis of at least a part of the generated user pattern.

According to one embodiment, the controller 430 may determine whether there is a currently being executed application program related to communication in the electronic device 401. When it is determined that there is the currently being executed application program, the controller 430 may confirm an amount (size) of data to be transmitted/received on the basis of the information related to the application program. The controller 430 may compare the amount (size) of data to be transmitted/received with a threshold (e.g., a first threshold Th1) that is preset with respect to an amount (size) of data for switching the communication interface. Here, a method of setting the threshold Th1 will be described later in more detail with reference to FIG. 8.

According to the comparison result, the electronic device 401 may determine whether the currently used communication interface is switched. For example, in the case in which the currently used communication interface is the first communication interface 410-1, when the amount (size) of data to be transmitted/received is equal to or larger than the preset threshold Th1, the controller 430 may determine that the first communication interface 410-1 is required to be switched to another communication interface (e.g., the second communication interface 410-2). When the amount (size) of data to be transmitted/received is less than the preset threshold Th1, the controller 430 may control the first communication interface 410-1 to be maintained as is.

On the other hand, in the case in which the currently used communication interface is the second communication interface 410-2, when the amount (size) of data to be transmitted/received is less than the preset threshold Th1, the controller 430 may determine that the second communication interface 410-2 is required to be switched to another communication interface (e.g., the first communication interface 410-1). When the amount (size) of data to be transmitted/received is equal to or larger than the preset threshold Th1, the controller 430 may control the second communication interface 410-2 to be maintained as is.

According to one embodiment, in the case in which the communication interface to be used is selected/switched as/to the second interface 410-2 (e.g., Wi-Fi) among the plurality of communication interfaces 410-1 to 410-N to perform a communication connection, when the amount (size) of data to be transmitted/received per one frame is less than a preset threshold (e.g., a second threshold Th2) for the amount (size) of data to be transmitted/received per one frame, the controller 430 may accumulate the amount (size) of data to be transmitted/received per one frame until it is equal to or larger than the present threshold Th2 without continuously transmitting and receiving the corresponding data, and may transmit and receive the corresponding data at once through the second communication interface 410-2 connected for communication.

According to one embodiment, the controller 430 may calculate an amount of energy consumption when data is transmitted and received using each communication interface. Here, when a total time taken to transmit and receive data is T, the total time T may be divided into a time interval $T_i$ (hereinafter, referred to as "first time interval") for preparing data transmission and reception, a time interval $T_t$ or $T_r$ (hereinafter, referred to as "second time interval") for transmitting/receiving actual data, and a time interval Te (hereinafter, referred to as "third time interval") for ending data transmission and reception, and energy consumed for each time interval may be different. In addition, consumption energy during the first time interval $T_i$ and the third time interval Te and consumption energy per unit data during the second time interval $T_t$ or $T_r$ may be set in advance for each communication interface as shown in Table 1 and Table 2. According to one embodiment, the total consumption energy $E_T$ at the time of data transmission and reception may be modeled as shown in the following Equation 1 and Equation 2.

$$E_T = E_i + E_e + E_t * \text{transmission data amount(size)} \quad \text{[Equation 1]}$$

$$E_T = E_i + E_e + E_r * \text{reception data amount(size)} \quad \text{[Equation 2]}$$

Here, Ei denotes initial consumption energy for data transmission and reception, for example, energy consumed during the time interval $T_i$ for preparing data transmission and reception. $E_e$ denotes consumption energy for ending data transmission and reception, for example, energy consumed during the time interval $T_e$ for ending data transmission and reception. $E_t$ and Er denote consumption energy for transmitting/receiving actual data, for example, energy consumed during the time interval $T_t$ or $T_r$ for transmitting/receiving actual data.

Meanwhile, the initial consumption energy $E_i$ may include change to active state energy $E_a$ for changing the communication interface to an active state when the communication interface is changed from a hold state to the active state. The consumption energy $E_e$ for ending may include change to hold state energy $E_l$ for changing the communication interface to the hold state when the corresponding communication interface is changed from the active state to the hold state.

Meanwhile, the electronic device 401 may further include a communication interface controller 440. The communication interface controller 440 may control the switching of the plurality of communication interfaces 410-1 to 410-N to select the communication interface to be used among the plurality of communication interfaces 410-1 to 410-N. For example, the communication interface controller 440 (e.g., Network Address Translation (NAK)) may control one public IP and port allocated to an upper layer (not shown) (e.g., application layer) between the communication interfaces 410 of the upper layer and an MAC layer to be converted into IPs and ports of several number of MAC layers corresponding to the plurality of communication interfaces 410-1 to 410-N. In FIG. 4, the controller 430 and the communication interface controller 440 are separately configured. However, the present disclosure is not limited thereto, and the controller 430 and the communication interface controller 440 may be integrated.

Figure 5A:
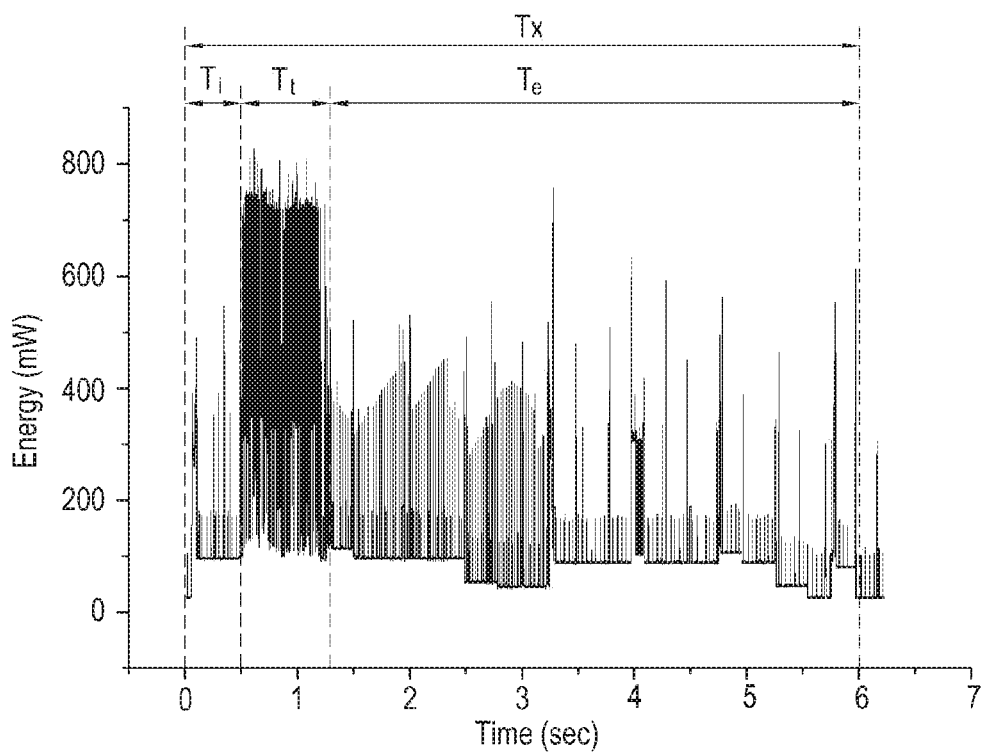
FIGS. 5A and 5B are graphs illustrating an example of consumption energy over time at the time of data transmission and reception via a first communication interface of an electronic device according to various embodiments.
Figure 5B:
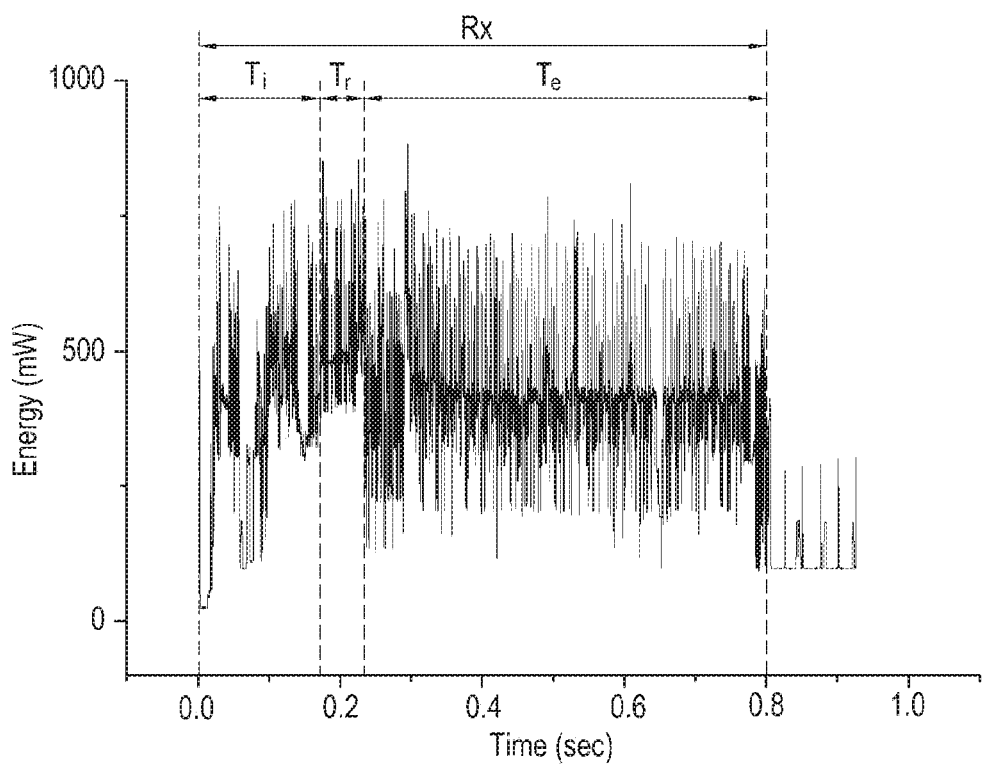

FIGS. 5A and 5B are graphs illustrating an example of consumption energy over time at the time of data transmission and reception via a first communication interface of an electronic device according to various embodiments.

Referring to FIG. 5A, it illustrates consumption energy over time at the time of data transmission via the first communication interface 410-1 (e.g., Bluetooth) of the electronic device 401 according to various embodiments. It can be seen that the consumption energy at the time of data transmission via the first communication interface 410-1 has an average value between about 100 mW to 200 mW during the first time interval $T_i$, has an average value between about 300 mW to 750 mW during the second time interval $T_t$, and has an average value between about 100 mW to 200 mW during the third time interval $T_e$.

Referring to FIG. 5B, it illustrates consumption energy over time at the time of data reception via the first communication interface 410-1 (e.g., Bluetooth) of the electronic device 401 according to various embodiments. It can be seen that the consumption energy at the time of data reception via the first communication interface 410-1 has an average value between about 300 mW to 600 mW during the first time interval $T_i$, has an average value between about 400 mW to 650 mW during the second time interval $T_r$, and has an average value between about 300 mW to 450 mW during the third time interval $T_e$.

As shown in FIGS. 5A and 5B, the total consumption energy $E_T$ consumed by the first communication interface 410-1 to transmit and receive data may be calculated as a sum of each consumption energy corresponding to the first to third time intervals by dividing a total time interval T for transmitting and receiving data into the first to third time intervals. In addition, the calculated total consumption energy $E_T$ may be calculated by adding, to the sum of the consumption energy corresponding to the first to third time intervals, at least one of the consumption energy $E_a$ consumed when the first communication interface 410-1 is changed from the hold state to the active state and the consumption energy $E_l$ consumed when the first communication interface 410-1 is changed from the active state to the hold state.

Figure 6A:
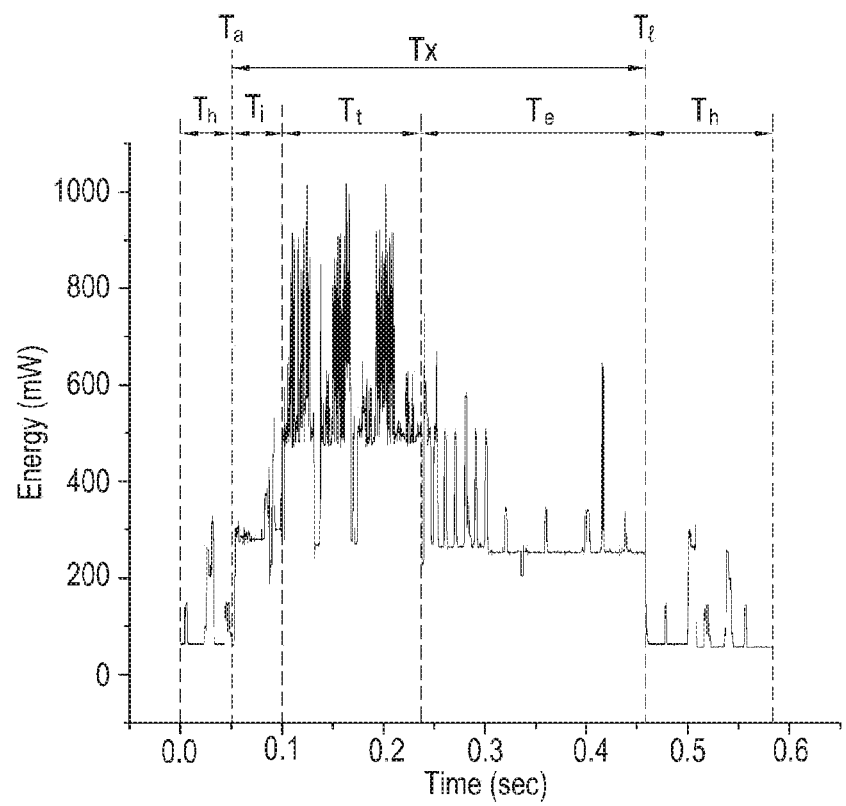
FIGS. 6A and 6B are graphs illustrating an example of consumption energy over time at the time of data transmission and reception via a second communication interface of an electronic device according to various embodiments.
Figure 6B:
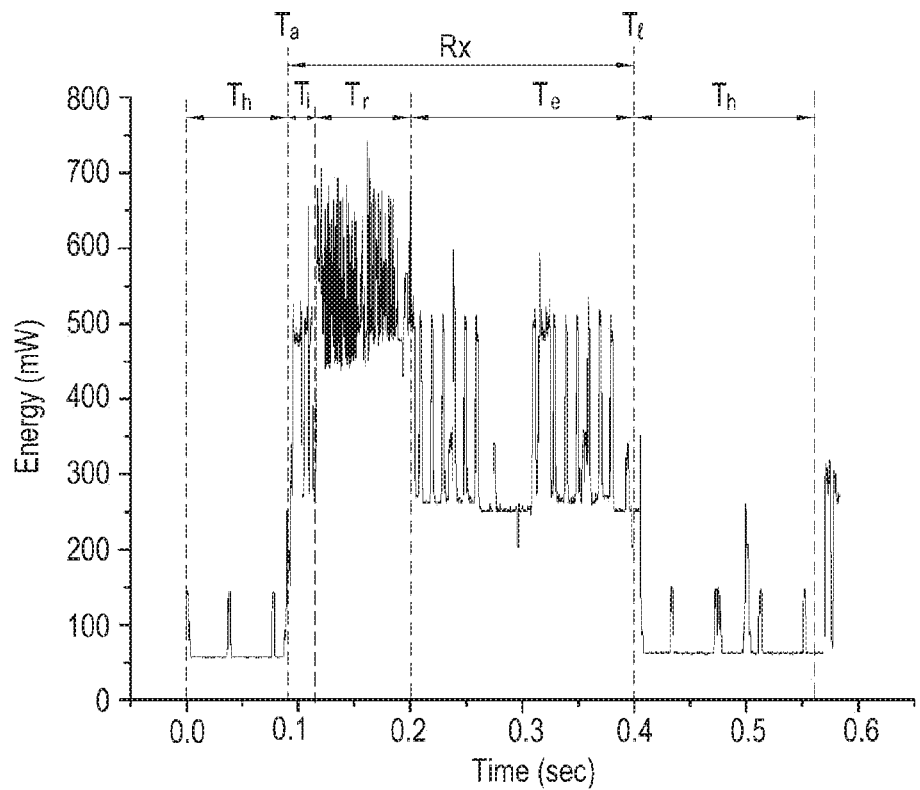

FIGS. 6A and 6B are graphs illustrating an example of consumption energy over time at the time of data transmission and reception via a second communication interface of an electronic device according to various embodiments.

Referring to FIG. 6A, it illustrates consumption energy over time (Tx) at the time of data transmission via the second communication interface 410-2 (e.g., Wi-Fi) of the electronic device 401 according to various embodiments. It can be seen that the consumption energy at the time of data transmission via the second communication interface 410-2 has an average value between about 300 mW to 500 mW during the first time interval $T_i$, has an average value between about 500 mW to 1000 mW during the second time interval $T_t$, and has an average value between about 300 mW to 550 mW during the third time interval $T_e$.

In addition, the second communication interface 410-2 (e.g., Wi-Fi) may be in a hold state Th before or after the time Tx at the time of data transmission. The energy Ea may also be consumed at the instant Ta when the second communication interface 410-2 enters the data transmission state Tt, that is, the active state, from the hold state Th. Similarly, the energy El may be consumed even at the instant $T_l$ when the second communication interface 410-2 enters the hold state $T_h$ again from the data transmission state $T_t$, that is, the active state. Although not shown in FIG. 5A, it will be understood by those skilled in the art that the energy may be consumed at the instant $T_a$ when the first communication interface 410-1 enters the data transmission state Tx from the hold state $T_h$ in a similar manner, or at the instant $T_l$ when the first communication interface 410-1 enters the hold state $T_h$ from the data transmission state Tt.

Referring to FIG. 6B, it illustrates consumption energy over time at the time of data reception via the second communication interface 410-2 (e.g., Wi-Fi) of the electronic device 401 according to various embodiments. It can be seen that the consumption energy at the time of data reception via the second communication interface 410-2 has an average value between about 250 mW to 500 mW during the first time interval $T_i$, has an average value between about 500 mW to 750 mW during the second time interval $T_r$, and has an average value between about 250 mW to 550 mW during the third time interval $T_e$.

In addition, the second communication interface 410-2 (e.g., Wi-Fi) may be in the hold state $T_h$ before or after the time Rx at the time of data reception. The energy Ea may also be consumed at the instant $T_a$ when the second communication interface 410-2 enters the data reception state $T_r$, that is, the active state, from the hold state $T_h$. Similarly, the energy $E_l$ may be consumed even at the instant $T_l$ when the second communication interface 410-2 enters the hold state $T_h$ again from the data reception state $T_a$, that is, the active state. Although not shown in FIG. 5B, it will be understood by those skilled in the art that the energy may be consumed at the instant $T_a$ when the first communication interface 410-1 enters the data reception state $T_r$ from the hold state $T_h$ in a similar manner, or at the instant $T_l$ when the first communication interface 410-1 enters the hold state $T_h$ from the data reception state $T_r$.

As shown in FIGS. 5A to 6B, in both the first and second communication interfaces 410-1 and 410-2, it can be seen that more energy is consumed in the second time interval $T_t$ or $T_r$ than in the first and third time intervals $T_i$ and $T_e$. That is, the consumption energy at the time of transmitting/receiving actual data is relatively larger than the consumption energy at the time of preparing data transmission and reception and the consumption energy at the time of ending data transmission and reception. In addition, the consumption energy in the second time interval $T_t$ or $T_r$ may be proportional to the amount of data. Accordingly, the electronic device 401 may transmit and receive data through a communication interface having the minimum consumption energy according to the amount of data to be transmitted and received, thereby enhancing the data transmission/reception efficiency.

Meanwhile, the total consumption energy $E_T$ at the time of data transmission and reception may be calculated by adding, to a sum of the consumption energy corresponding to the first to third time intervals calculated using Equation 1 and Equation 2, at least one of the consumption energy $E_a$ consumed when the corresponding communication interface is changed from the hold state to the active state and the consumption energy $E_l$ consumed when the corresponding communication interface is changed from the active state to the hold state.

Figure 7A:
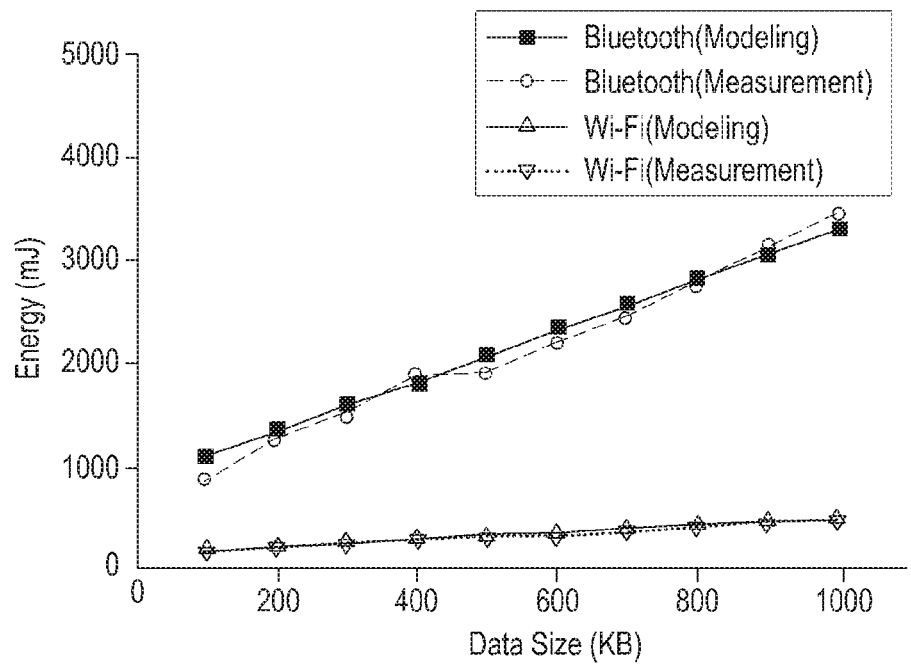
FIGS. 7A and 7B are comparative graphs illustrating an example of consumption energy according to an amount of data at the time of data transmission and reception via a first communication interface and a second communication interface of an electronic device according to various embodiments.
Figure 7B:
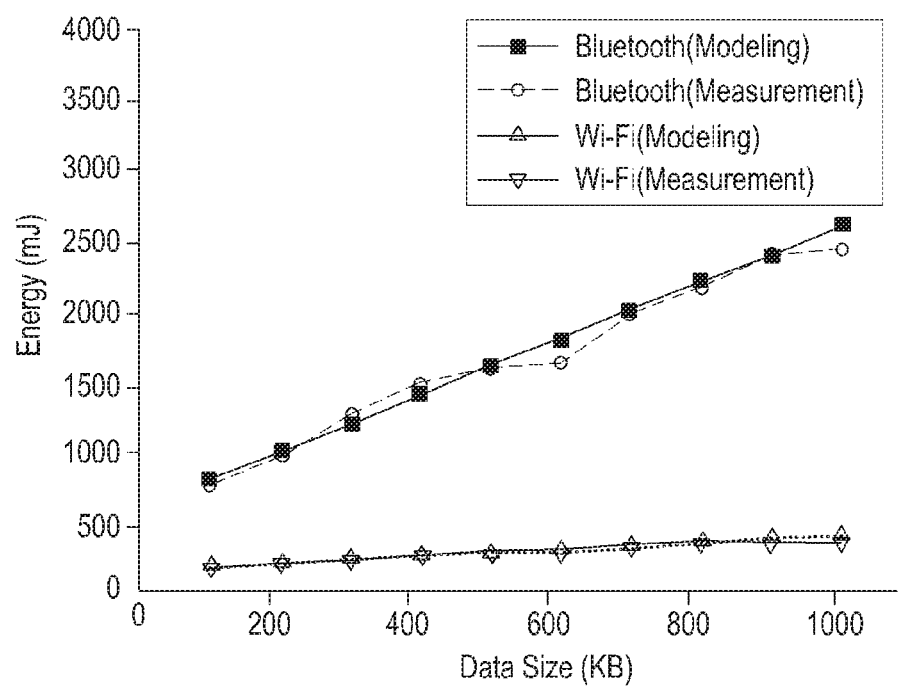

FIGS. 7A and 7B are comparative graphs illustrating an example of consumption energy according to an amount of data at the time of data transmission and reception via a first communication interface and a second communication interface of an electronic device according to various embodiments.

FIG. 7A illustrates a modeling value and a measurement value of consumption energy according to an amount of data at the time of data transmission through the first communication interface 410-1 (e.g., Bluetooth) and the second communication interface 410-2 (e.g., Wi-Fi) of the electronic device according to various embodiments. Referring to FIG. 7A, when the same amount of data is transmitted, the consumption energy at the time of data transmission through the first communication interface 410-1 is relatively larger than the consumption energy at the time of data transmission through the second communication interface 410-2. In addition, it can be seen that, when data is transmitted through the first communication interface 410-1, the consumption energy gradually increases in proportion to the amount of data. On the other hand, when data is transmitted through the second communication interface 410-2, the consumption energy gradually increases in proportion to the amount of data, but a difference therebetween is small compared to the first communication interface 410-1. For example, it can be seen that a difference between the energy consumed at the time of transmitting data of about 200 KB and the energy consumed at the time of transmitting data of about 1000 KB is relatively much smaller in the case of the second communication interface 410-2 than in the case of the first communication interface 410-1. That is, when the amount of data to be transmitted is large, the electronic device 401 may further increase the data transmission efficiency by reducing the energy consumed at the time of data transmission using the second communication interface 410-2 rather than using the first communication interface 410-1.

FIG. 7B illustrates a modeling value and a measurement value of consumption energy according to an amount of data at the time of data reception through the first communication interface 410-1 (e.g., Bluetooth) and the second communication interface 410-2 (e.g., Wi-Fi) of the electronic device according to various embodiments. Referring to FIG. 7B, as described in FIG. 7A, when the same amount of data is received, the consumption energy at the time of data reception through the first communication interface 410-1 is relatively larger than the consumption energy at the time of data reception through the second communication interface 410-2. In addition, it can be seen that, when data is received through the first communication interface 410-1, the consumption energy gradually increases in proportion to the amount of data. On the other hand, when data is received through the second communication interface 410-2, the consumption energy gradually increases in proportion to the amount of data, but a difference therebetween is small compared to the first communication interface 410-1. For example, it can be seen that a difference between the energy consumed at the time of receiving data of about 200 KB and the energy consumed at the time of receiving data of about 1000 KB is relatively much smaller in the case of the second communication interface 410-2 than in the case of the first communication interface 410-1. That is, when the amount of data to be received is large, the electronic device 401 may further increase the data reception efficiency by reducing the energy consumed at the time of data reception using the second communication interface 410-2 rather than using the first communication interface 410-1.

Meanwhile, although not shown in FIGS. 7A and 7B, when the amount of data to be transmitted/received is very small (e.g., several tens to thousands of bytes), the consumption energy at the time of data transmission and reception is relatively smaller in the case of the first communication interface 410-1 than in the second communication interface 410-2. In this case, the electronic device 401 may further increase the transmission and reception efficiency by reducing the energy consumed at the time of data transmission and reception using the first communication interface 410-1 rather than using the second communication interface 410-2.

In this manner, the electronic device 401 may preset a time point when the switching between the first communication interface 410-1 and the second communication interface 420-2 is required, that is, an amount (size) of data (e.g., the first threshold Th1) requiring the switching of the communication interface.

Figure 8:
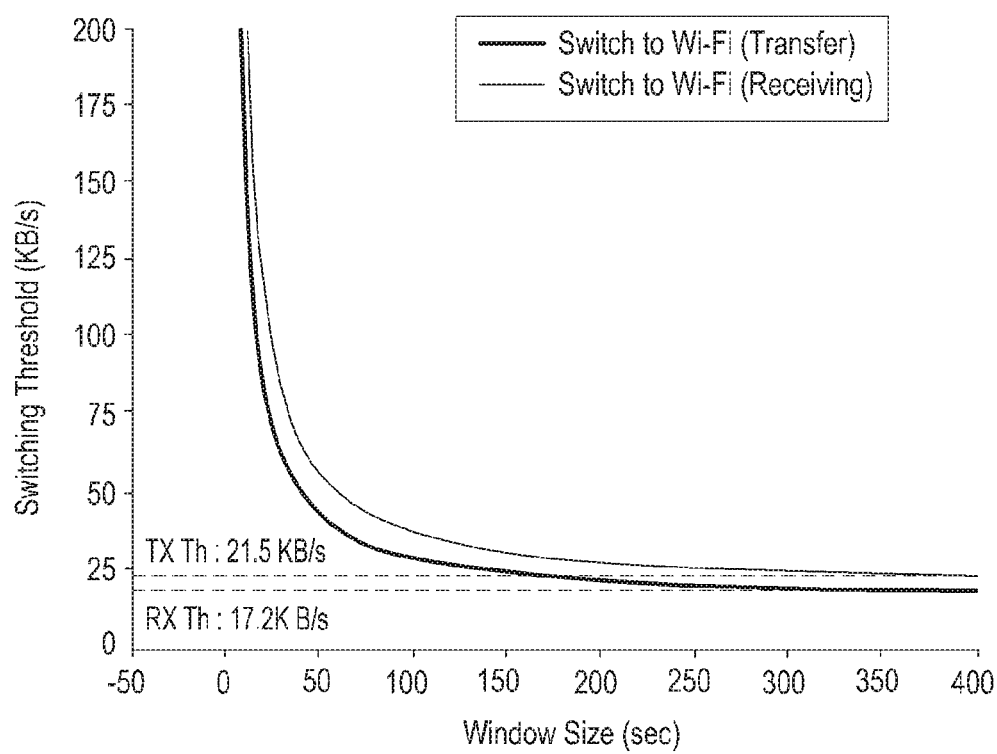
FIG. 8 is a graph illustrating a threshold for an amount of data for switching a communication interface according to a preset window size at the time of data transmission and reception via a communication interface of an electronic device according to various embodiments.

FIG. 8 is a graph illustrating a threshold for an amount of data for switching a communication interface according to a preset window size at the time of data transmission and reception via a communication interface of an electronic device according to various embodiments.

Referring to FIG. 8, it can be seen that a threshold (e.g., the first threshold) for an amount of data per unit time requiring the switching of the communication interface is drastically reduced along with an increase in the window size.

The electronic device 401 may preset a window size for generating a user pattern at the time of data transmission and reception. For example, the electronic device 401 may preset the window size in units of seconds, minutes, hours, days, or years. The electronic device 401 may generate and store a user pattern analyzed during the preset window size. When the preset window size is smaller than the time interval during which data is transmitted or received, the electronic device 401 may update the user pattern analyzed during the preset window size as the time interval to be analyzed is shifted over time. For example, when the preset window size is 30 seconds and the data transmission time is 1 minute, the electronic device 401 may continuously generate and update the user pattern analyzed during the preset window size that is shifted at a predetermined interval over time.

In this manner, the electronic device 401 analyzes the user pattern according to the window size, and generates a graph indicating the amount (size) of data (e.g., the first threshold Th1) per unit time requiring the switching of the communication interface at the time of data transmission and reception according to the window size, as shown in FIG. 8.

The electronic device 401 may preset a threshold (e.g., the first threshold Th1) for the amount of data per unit time at the time of data transmission and reception for the switching of the communication interface using the graph. For example, when the window size is set as 400 second(s), the preset threshold Th1 may be set as 21.5 KB/s at the time of data transmission and may be set as 17.2 KB/s at the time of data reception.

According to one embodiment, in the case in which the currently used communication interface is the first communication interface 410-1, the electronic device 401 may determine that the currently used communication interface is switched when an amount of data per unit time to be currently transmitted is equal to or larger than the preset threshold Th1 (e.g., 21.5 KB/s), and may determine that the currently used communication interface is maintained when the amount of data per unit time to be currently transmitted is less than the preset threshold Th1 (e.g., 21.5 KB/s).

According to one embodiment, in the case in which the currently used communication interface is the second communication interface 410-2, the electronic device 401 may determine that the currently used communication interface is maintained when the amount of data per unit time to be currently transmitted is equal to or larger than the preset threshold Th1 (e.g., 21.5 KB/s), and may determine that the currently used communication interface is switched to another communication interface when the amount of data per unit time to be currently transmitted is less than the preset threshold Th1 (e.g., 21.5 KB/s). For example, when the window size is preset as about 30 seconds, the electronic device 401 may set a threshold value of the amount of data per unit time at the time of data transmission for determining whether the communication interface is switched, as about 200 KB/s. Assuming that the currently used communication interface is the first communication interface 410-1 (e.g., Bluetooth) and the amount of data per unit time to be current transmitted is 400 KB/s, the electronic device 401 may determine that the currently used first communication interface 410-1 is switched because the amount of data to be transmitted per unit time is larger than the threshold value Th1. Assuming that the currently used communication interface is the second communication interface 410-2 (e.g., Wi-Fi) and the amount of data per unit time to be current transmitted is 400 KB/s, the electronic device 401 may determine that the currently used second communication interface 410-2 is maintained as is because the amount of data to be transmitted per unit time is larger than the threshold value Th1.

According to various embodiments, an electronic device may include a plurality of communication interfaces; and a controller configured to determine a currently being executed application program related to communication and to select a communication interface to be used among the plurality of communication interfaces on the basis of at least a part of information related to the currently being executed application program related to the communication, user profile information related to the communication, or information on consumption energy for each communication state of each of the plurality of communication interfaces.

According to various embodiments, the controller may generate a communication history pattern of the electronic device related to the executed application program on the basis of at least a part of the information related to the currently being executed application program related to the communication and the user profile information related to the communication, may calculate consumption energy at the time of data transmission and reception using each communication interface corresponding to the generated communication history pattern of the electronic device on the basis of at least a part of the information on consumption energy for each communication state of each of the plurality of communication interfaces, may select a communication interface in which the calculated consumption energy has a minimum value among the plurality of communication interfaces, and may perform a communication connection using the selected communication interface.

According to various embodiments, the controller may confirm first consumption energy that is preset to correspond to a first time interval for preparing data transmission and reception among a total time interval at the time of data transmission and reception from the information on consumption energy for each communication state of each of the plurality of communication interfaces, consumption energy per unit data that is preset to correspond to a second time interval for transmitting and receiving actual data among the total time interval at the time of data transmission and reception, and third consumption energy that is preset to correspond to a third time interval for ending data transmission and reception among the total time interval at the time of data transmission and reception. The controller may calculate second consumption energy by multiplying the confirmed consumption energy per unit data and an amount of data to be transmitted and received, and may calculate the second consumption energy at the time of data transmission and reception using each communication interface by adding the calculated second consumption energy and the confirmed first and third consumption energy.

According to various embodiments, the controller may determine whether a switching condition of the communication interface is satisfied when there is a currently being used communication interface, may calculate consumption energy at the time of data transmission and reception using each communication interface on the basis of at least a part of the information on consumption energy for each communication state of each of the plurality of communication interfaces when the switching condition of the communication interface is satisfied, may select a communication interface in which the calculated consumption energy has a minimum value among the plurality of communication interfaces, and may switch the currently being used communication interface to the selected communication interface when the selected communication interface does not coincide with the currently used communication interface.

According to various embodiments, the switching condition of the communication interface may include at least one of a type of the application program related to currently executed communication, a communication connection type of the currently used communication interface, an amount of data, or the consumption energy at the time of data transmission and reception.

According to various embodiments, the controller may determine that the switching of the communication interface is required when the currently used communication interface does not correspond to a communication interface supported or designated in the application program related to the currently executed communication, on the basis of the information related to the application program related to the currently executed communication.

According to various embodiments, the controller may determine that the switching of the communication interface is required when an external electronic device connected through the currently used communication interface is indirectly connected to the electronic device.

According to various embodiments, the controller may set a first threshold for the amount of data serving as a reference for switching of the communication interface.

According to various embodiments, in the case in which the currently used communication interface is the first communication interface, the controller may determine that the switching of the communication interface is required when the amount of data to be transmitted and received is equal to or larger than the preset first threshold. In the case in which the currently used communication interface is the second communication interface, the controller may determine that the switching of the communication interface is required when the amount of data to be transmitted and received is less than the preset first threshold.

According to various embodiments, the first communication interface may be Bluetooth, and the second communication interface may be Wi-Fi.

According to various embodiments, the controller may further perform a communication connection using the switched communication interface.

According to various embodiments, in the case in which the switched communication interface is the second communication interface, the controller may perform the communication connection using the switched second communication interface, may accumulate, when the amount of data to be transmitted and received is less than a second threshold that is preset for an amount of data to be transmitted and received per frame, the amount of data to be transmitted and received until the amount of data to be transmitted and received becomes the preset second threshold or larger, and then may transmit and receive the accumulated amount of data to be transmitted and received at once through the second communication interface connected for communication.

Figure 9:
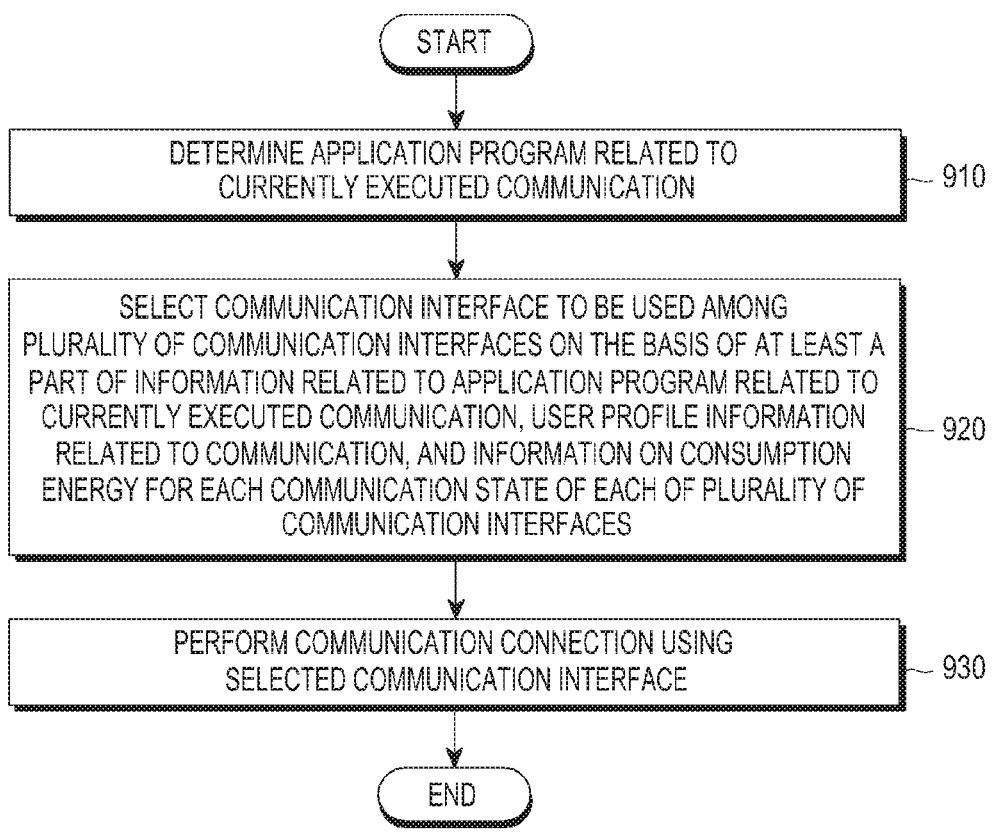
FIG. 9 is a flowchart illustrating a communication connection method of an electronic device according to various embodiments.

FIG. 9 is a flowchart illustrating a communication connection method of an electronic device according to various embodiments. The method may include operations 910 to 930. The communication connection method of the electronic device may be performed by at least one of the electronic device (e.g., the electronic device 101, 201, or 401), the processor (e.g., the processor 120 or the processor 210) of the electronic device, and the controller (e.g., the controller 430) of the electronic device.

In operation 910, the electronic device may determine a currently executed application program related to communication capable of transmitting and receiving data. For example, when the application program related to the communication is executed, the controller may determine the currently executed application program on the basis of the information related to the executed application program. According to one embodiment, the information related to the application program includes at least one of an application program name (application name), whether the application program is currently used (application suspend), a minimum bandwidth requested by the application program (minimum required bandwidth), and an application program usage (sustained) time. The application program usage (sustained) time may include a total usage time of the application program (total continuance time), a network usage cycle (classified by block) of the application program, and the like.

In operation 920, the electronic device may select a communication interface to be used among the plurality of communication interfaces on the basis of at least a part of information related to the application program related to the currently executed communication, user profile information related to the communication, or information on consumption energy for each communication state of each of the plurality of communication interfaces. The operation of selecting the communication interface to be used among the plurality of communication interfaces will be described later in more detail with reference to FIGS. 10 and 11.

According to one embodiment, the user profile information may include a communication history pattern (hereinafter, referred to as "user pattern") of the electronic device 401 by the use of communication of a user. The user pattern may be analyzed and generated in association with information required when the application program related to the communication is used.

In operation 930, the electronic device may perform a communication connection of the electronic device using the selected communication interface.

Figure 10:
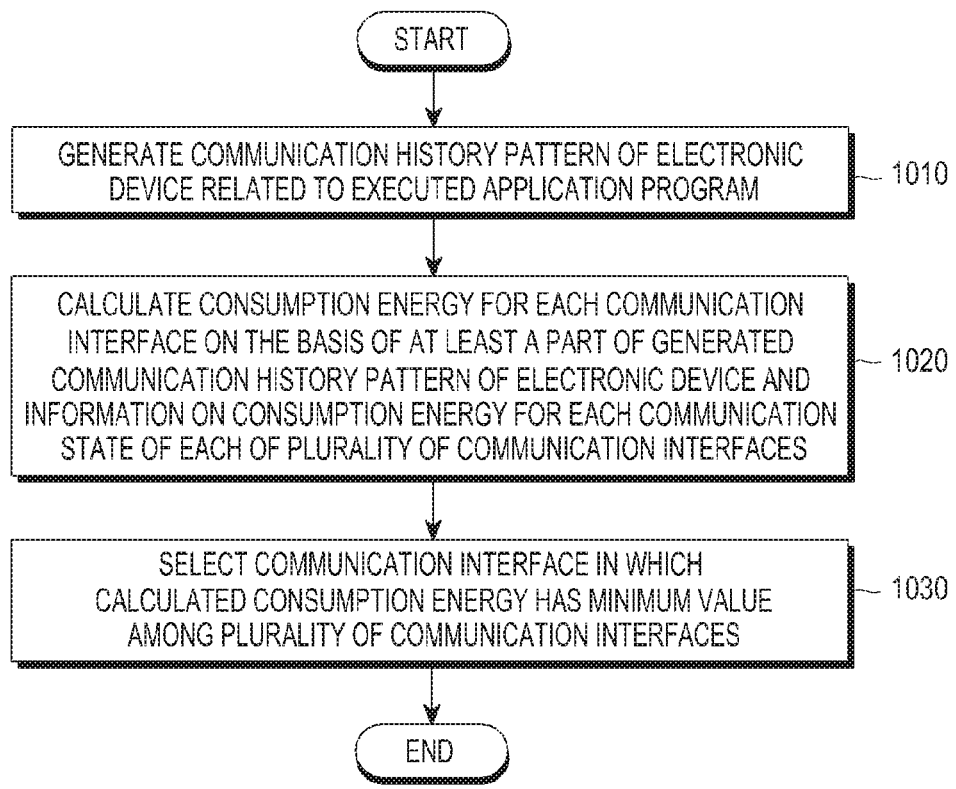
FIG. 10 is a flowchart illustrating a communication connection method of an electronic device according to various embodiments.

FIG. 10 is a flowchart illustrating a communication connection method of an electronic device according to various embodiments. FIG. 10 is a detailed flowchart illustrating a method of selecting the communication interface to be used among the plurality of communication interfaces in operation 920 shown in FIG. 9, and may include operations 1010 to 1030. The communication connection method of the electronic device may be performed by at least one of the electronic device (e.g., the electronic device 101, 201, or 401), the processor (e.g., the processor 120 or the processor 210) of the electronic device, and the controller (e.g., the controller 430) of the electronic device.

In operation 1010, the electronic device may generate a communication history pattern (hereinafter, referred to as "user pattern) of the electronic device related to the application program related to the executed communication on the basis of at least a part of the information related to the application program related to the executed communication and the user profile information related to the communication. For example, the electronic device 401 may preset a unit time, i.e., a window size, for analyzing the user pattern. The electronic device 401 may analyze the user pattern using the usage time, the continuance time, the usage cycle, and data transmission and reception amount (size) of each application program of the user for the unit time of the preset window size.

In operation 1020, the electronic device may calculate consumption energy at the time of a communication connection using each communication interface on the basis of at least a part of the generated user pattern and the information on consumption energy for each communication state of each of the plurality of communication interfaces.

According to one embodiment, the electronic device may calculate the consumption energy for each of at least one communication state corresponding to the generated user pattern using the information on consumption energy for each communication state of each of the plurality of communication interfaces as shown in Tables 1 and 2. The information on consumption energy for each communication state of each of the plurality of communication interfaces may include at least one of minimum/maximum/average consumption energy at the time of turn on of each communication interface, minimum/maximum/average consumption energy at the time of turn off thereof, minimum/maximum/average consumption energy at the time of idle, minimum/maximum/average consumption energy at the time of connect, average consumption energy per unit data (e.g., about 1 KB/s) at the time of data transmission, and average consumption energy per unit data (e.g., about 1 KB/s) at the time of data reception. Here, when communication state is the data transmission and reception state, referring again to FIGS. 5A to 6B, the electronic device may confirm first consumption energy that is preset to correspond to a first time interval among a total time interval at the time of data transmission and reception from the information on consumption energy for each communication state of each of the plurality of communication interfaces. The electronic device may confirm consumption energy per unit data that is preset to correspond to a second time interval among the total time interval from the information on consumption energy for each communication state of each of the plurality of communication interfaces, and may calculate the second consumption energy by multiplying the confirmed consumption energy per unit data and an amount of data to be transmitted and received. In addition, the electronic device may confirm third consumption energy that is preset to correspond to a third time interval among the total time interval from the information on consumption energy for each communication state of each of the plurality of communication interfaces. Next, the electronic device may calculate the consumption energy consumed at the time of data transmission and reception by calculating a sum of the calculated second consumption energy and the confirmed first and third consumption energy.

According to one embodiment, when the currently used communication interface is switched to another communication interface, the calculated total consumption energy may be calculated by adding, to a sum of the first to third consumption energy, at least one of consumption energy El at a time point Tl when the currently used communication interface is changed from the active state to the hold state and consumption energy Ea at a time point Ta when the selected communication interface is changed from the hold state to the active state.

In operation 1030, the electronic device may select a communication interface in which the calculated consumption energy has a minimum value among the plurality of communication interfaces. The electronic device may perform a communication connection of the electronic device using the selected communication interface, as in operation 930 of FIG. 9.

Figure 11:
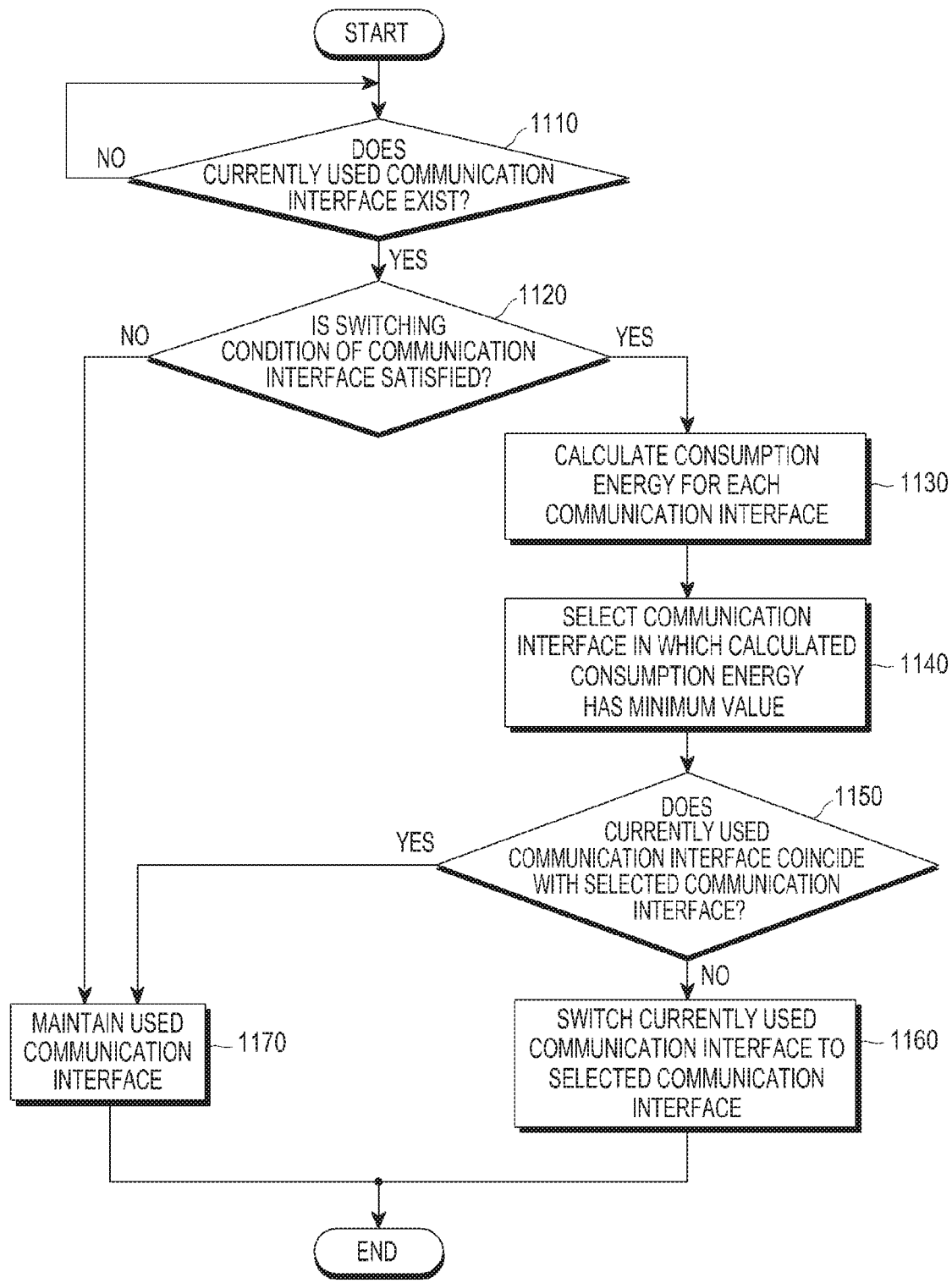
FIG. 11 is a flowchart illustrating a communication connection method of an electronic device according to various embodiments.

FIG. 11 is a flowchart illustrating a communication connection method of an electronic device according to various embodiments. FIG. 11 is a detailed flowchart illustrating a method of selecting the communication interface to be used among the plurality of communication interfaces in operation 920 shown in FIG. 9, and may include operations 1110 to 1170. The communication connection method of the electronic device may be performed by at least one of the electronic device (e.g., the electronic device 101, 201, or 401), the processor (e.g., the processor 120 or the processor 210) of the electronic device, and the controller (e.g., the controller 430) of the electronic device.

In operation 1110, the electronic device may determine whether there is a currently used communication interface. The electronic device may perform operation 1120 when there is the currently used communication interface in operation 1110, and may periodically or aperiodically perform operation 1110 when there is no currently used communication interface.

In operation 1120, the electronic device may determine whether switching of the currently used communication interface is required. For example, the electronic device may determine whether the switching of the currently used communication interface satisfies a required condition (hereinafter, referred to as "switching condition"). The electronic device may perform operation 1130 when the switching of the currently used communication interface is required (when the switching condition is satisfied), and may perform operation 1170 when the switching of the currently used communication interface is not required (when the switching condition is not satisfied).

According to one embodiment, the switching condition may include at least one of a type of the application program related to the currently executed communication, a communication connection type of the currently used communication interface, a data transmission amount (size), and the consumption energy at the time of data transmission and reception.

According to one embodiment, the electronic device may determine whether the currently used communication interface is switched according to the type of the application program related to the currently executed communication. For example, the electronic device may maintain the currently used communication interface when the currently used communication interface corresponds to a communication interface that is supported or designated in the application program related to the currently executed communication on the basis of the information related to the application program related to the currently executed communication, and may determine that the switching of the currently used communication interface is required when the currently used communication interface does not correspond to the communication interface.

According to one embodiment, the electronic device may determine whether the currently used communication interface is switched according to the communication connection type of the currently used communication interface. For example, the electronic device may maintain the currently used communication network when an external electronic device connected through the currently used communication interface is directly connected to the electronic device in the same network, and may determine that the switching of the currently used communication interface is required when the electronic device is indirectly connected to a different network or another external electronic device in the different network.

According to one embodiment, the electronic device may determine whether the currently used communication interface is switched according to an amount (size) of unit data at the time of data transmission and reception. To this end, the electronic device may preset a threshold Th1 for a reference amount (size) of data for switching the communication interface. For example, in the case in which the currently used communication interface is the first communication interface (e.g., Bluetooth), when the amount (size) of data to be transmitted/received is equal to or larger than the preset threshold Th1, the electronic device may determine that the currently used communication interface is required to be switched to another communication interface. In this case, the electronic device may switch the currently used first communication interface to the second communication interface (e.g., Wi-Fi). For example, in the case in which the currently used communication interface is the second communication interface (e.g., Wi-Fi), when the amount (size) of data to be transmitted/received is less than the preset threshold Th1, the electronic device may determine that the currently used communication interface is required to be switched to another communication interface. In this case, the electronic device may switch the currently used first communication interface to the second communication interface (e.g., Wi-Fi).

In operation 1130, the electronic device may calculate consumption energy at the time of data transmission and reception by performing communication using each communication interfaces on the basis of at least a part of the information on consumption energy for each communication state of each of the plurality of communication interfaces as shown in Tables 1 and 2. The calculating of the consumption energy in operation 1130 may be the same as operation 1020 of FIG. 10, and thus a detailed description thereof will be replaced with the above description.

In operation 1140, the electronic device may select a communication interface in which the calculated consumption energy has a minimum value among the plurality of communication interfaces.

In operation 1150, the electronic device may determine whether the currently used communication interface coincides with the selected communication interface. When the currently used communication interface coincides with the selected communication interface in operation 1150, the electronic device may perform operation 1160, and otherwise, may perform operation 1170.

In operation 1160, the electronic device may switch the currently used communication interface to the selected communication interface.

According to one embodiment, the electronic device may control one public IP and port allocated to an upper layer (not shown) (e.g., application layer) between the plurality of communication interfaces of the upper layer and an MAC layer to be converted into IPs and ports of several number of MAC layers. Accordingly, it is possible to perform a communication connection without a communication disconnection at the time of switching the communication interface.

In operation 1170, the electronic device may maintain the currently used communication interface as is.

According to various embodiments, a communication connection method of an electronic device may include determining an application program related to currently executed communication; and selecting a communication interface to be used among the plurality of communication interfaces on the basis of at least a part of information related to the application program related to the currently executed communication, user profile information related to the communication, or information on consumption energy for each communication state of each of the plurality of communication interfaces.

According to various embodiments, the selecting of the communication interface to be used among the plurality of communication interfaces may include generating a communication history pattern of the electronic device related to the executed application program on the basis of at least a part of the information related to the application program related to the executed communication and the user profile information related to the communication, calculating consumption energy at the time of data transmission and reception using each communication interface corresponding to the generated communication history pattern of the electronic device on the basis of at least a part of the information on consumption energy for each communication state of each of the plurality of communication interfaces, and selecting a communication interface in which the calculated consumption energy has a minimum value among the plurality of communication interfaces.

According to various embodiments, the calculating of the consumption energy at the time of data transmission and reception may include confirming first consumption energy that is preset to correspond to a first time interval for preparing data transmission and reception among a total time interval at the time of data transmission and reception from the information on consumption energy for each communication state of each of the plurality of communication interfaces, consumption energy per unit data that is preset to correspond to a second time interval for transmitting and receiving actual data among the total time interval at the time of data transmission and reception, and third consumption energy that is preset to correspond to a third time interval for ending data transmission and reception among the total time interval at the time of data transmission and reception, calculating the second consumption energy by multiplying the confirmed consumption energy per unit data and an amount of data to be transmitted and received, and calculating a sum of the calculated second consumption energy and the confirmed first and third consumption energy.

According to various embodiments, the selecting of the communication interface to be used among the plurality of communication interfaces may include determining whether a switching condition of the communication interface is satisfied when there is a currently used communication interface, calculating consumption energy at the time of data transmission and reception using each communication interface on the basis of at least a part of the information on consumption energy for each communication state of each of the plurality of communication interfaces when the switching condition of the communication interface is satisfied, selecting a communication interface in which the calculated consumption energy has a minimum value among the plurality of communication interfaces, and switching the currently used communication interface to the selected communication interface when the selected communication interface does not coincide with the currently used communication interface.

According to various embodiments, the switching condition of the communication interface may include at least one of a type of the application program related to currently executed communication, a communication connection type of the currently used communication interface, an amount of data, and the consumption energy at the time of data transmission and reception.

According to various embodiments, the selecting of the communication interface to be used among the plurality of communication interfaces may include determining that the switching of the communication interface is required when the currently used communication interface does not correspond to a communication interface that is supported or designated in the application program related to the currently executed communication on the basis of the information related to the application program related to the currently executed communication.

According to various embodiments, the determining of whether the switching condition of the communication interface is satisfied may include determining that the switching of the communication interface is required when an external electronic device connected through the currently used communication interface is indirectly connected to the electronic device.

According to various embodiments, the determining of whether the switching condition of the communication interface is satisfied may include setting a threshold for the amount of data serving as a reference for the switching of the communication interface.

According to various embodiments, the selecting of the communication interface to be used among the plurality of communication interfaces may include determining that the switching of the communication interface is required when the amount of data to be transmitted and received is equal to or larger than the preset threshold in the case in which the currently being used communication interface is the first communication interface, and may determine that the switching of the communication interface is required when the amount of data to be transmitted and received is less than the preset threshold in the case in which the currently used communication interface is the second communication interface.

According to various embodiments, the first communication interface may be Bluetooth, and the second communication interface may be Wi-Fi.

According to various embodiments, the communication connection method of the electronic device may further include performing a communication connection using the switched communication interface.

According to various embodiments, the communication connection method of the electronic device may further include performing the communication connection using the switched second communication interface in the case in which the switched communication interface is the second communication interface, accumulating, when the amount of data to be transmitted and received is less than a second threshold that is preset for an amount of data to be transmitted and received per frame, the amount of data to be transmitted and received until the amount of data to be transmitted and received becomes the preset second threshold or larger, and then transmitting and receiving the accumulated amount of data to be transmitted and received at once through the second communication interface connected for communication.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiments, in a storage medium storing commands, the commands may be set to cause at least one processor to perform at least one operation when they are executed by the at least one processor, wherein the at least one operation may include determining an application program related to currently executed communication, and selecting a communication interface to be used among the plurality of communication interfaces on the basis of at least a part of information related to the application program related to the currently executed communication, user profile information related to the communication, or information on consumption energy for each communication state of each of the plurality of communication interfaces.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The invention claimed is:
1. An electronic device comprising:
a plurality of communication interfaces; and
a processor configured to:
  determine a first application related to communication that is currently being executed,
  select a first communication interface to be used among the plurality of communication interfaces, based on energy consumption information for each communication state of each of the plurality of communication interfaces, and
  perform a communication connection using the first communication interface,
wherein the energy consumption information comprises, for each of the plurality of communication interfaces, a first energy consumption for an activation period of a communication interface, an energy consumption per unit data for transmitting and receiving using the communication interface, and a second energy consumption for a deactivation period of the communication interface, and
wherein, when the processor calculates a total energy consumption of a communication interface of the plurality of communication interfaces, the processor is further configured to:
  multiply the energy consumption per unit data and an amount of data to be transmitted and received to generate an active energy consumption, and
  add the active energy consumption, the first energy consumption, and the second energy consumption to calculate the total energy consumption.
2. The electronic device of claim 1,
wherein the processor is further configured to:
  generate a communication history pattern of the electronic device related to the first application based on application information related to the first application or user profile information related to the communication, and calculate the total energy consumption at a time of data transmission and reception for each communication interface based on the communication history pattern and the energy consumption information, wherein the first communication interface has a lowest energy consumption among the plurality of communication interfaces.

3. The electronic device of claim 2, wherein the user profile information comprises a time that the first application is executed, a time the user continues use of the first application, a usage cycle of the first application, and an average amount of data transmitted or received per unit time.

4. The electronic device of claim 2, wherein the application information related to the first application comprises application suspension information, a minimum bandwidth requested by the first application, a sustained usage time of the first application, a total usage time of the first application, and a network usage cycle of each module of the first application.

5. The electronic device of claim 2, wherein the processor is further configured to:
when the first communication interface is being used, determine whether a switching condition of the first communication interface is satisfied,
when the switching condition of the first communication interface is satisfied, calculate an energy consumption at the time of data transmission and reception for each communication interface based on the energy consumption information,
select a second communication interface having a lowest energy consumption among the plurality of communication interfaces, and
when the second communication interface is different from the first communication interface, perform a communication connection using the second communication interface.

6. The electronic device of claim 5, wherein the switching condition includes at least one of a type of the application, a communication connection type, an amount of data, or the total energy consumption.

7. The electronic device of claim 6, wherein the processor is further configured to set the switching condition based on a first threshold for the amount of data.

8. The electronic device of claim 7, wherein the processor is further configured to:
determine whether the amount of data is equal to or larger than the first threshold,
when the amount of data is equal to or larger than the first threshold, transmit and receive the data using the first communication interface, and
when the amount of data is less than the first threshold, transmit and receive the data using the second communication interface.

9. The electronic device of claim 8, wherein the first communication interface includes one of a Bluetooth module or a Wi-Fi module, and the second communication interface is different from the first communication interface.

10. The electronic device of claim 8, wherein, when the processor transmits and receives the data using the second communication interface, the processor is further configured to:
perform the communication connection using the second communication interface,
when the amount of data to be transmitted and received is less than a second threshold for data to be transmitted and received per frame, accumulate the amount of data until the amount of data is equal to or greater than the second threshold, and
transmit and receive the accumulated amount of data using the second communication interface.

11. The electronic device of claim 1, wherein the energy consumption information further comprises, for each of the plurality of communication interfaces, a third energy consumption to setup a connection and a fourth energy consumption to idle the connection.

12. A method of an electronic device, comprising:
determining a first application related to communication that is currently being executed;
selecting a first communication interface to be used among a plurality of communication interfaces, based on energy consumption information for each communication state of each of the plurality of communication interfaces; and
performing a communication connection using the first communication interface,
wherein the energy consumption information comprises, for each of the plurality of communication interfaces, a first energy consumption for an activation period of a communication interface, an energy consumption per unit data for transmitting and receiving using the communication interface, and a second energy consumption for a deactivation period of the communication interface, and
wherein the selecting of the first communication interface further comprises:
multiplying the energy consumption per unit data and an amount of data to be transmitted and received to generate an active energy consumption, and
adding the active energy consumption, the first energy consumption, and the second energy consumption to calculate a total energy consumption.

13. The method of claim 12,
wherein the selecting of the first communication interface to be used among the plurality of communication interfaces comprises:
generating a communication history pattern of the electronic device related to the first application based on application information related to the first application or user profile information related to the communication, and
calculating the total energy consumption at a time of data transmission and reception for each communication interface based on the communication history pattern and the energy consumption information, and
wherein the first communication interface has a lowest energy consumption among the plurality of communication interfaces.

14. The method of claim 13, further comprising:
when the first communication interface is being used, determining whether a switching condition of the first communication interface is satisfied;
when the switching condition of the communication interface is satisfied, calculating an energy consumption at the time of data transmission and reception for each communication interface based on the energy consumption information;
selecting a second communication interface having a lowest consumption among the plurality of communication interfaces; and when the second communication interface is different from the first communication interface, perform a communication connection using the second communication interface.

15. The method of claim 14, wherein the determining of whether the switching condition is satisfied comprises:
setting a first threshold for an amount of data;
determining whether the amount of data is equal to or larger than the first threshold;
when the amount of data is equal to or larger than the first threshold, transmit and receive the data using the first communication interface; and
when the amount of data is less than the first threshold, transmit and receive the data using the second communication interface.

16. The method of claim 15, further comprising:
performing the communication connection using the second communication interface;
when the amount of data to be transmitted and received is less than a second threshold for data to be transmitted and received per frame, accumulating the amount of data until the amount of data is equal to or greater than the second threshold; and
transmitting and receiving the accumulated amount of data using the second communication interface connected.

* * * * *